(12) United States Patent
Kim

(10) Patent No.: US 6,377,625 B1
(45) Date of Patent: Apr. 23, 2002

(54) METHOD AND APPARATUS FOR GENERATING STEROSCOPIC IMAGE USING MPEG DATA

(75) Inventor: Man Bae Kim, Chunchon (KR)

(73) Assignee: Soft4D Co., Ltd., Songnam (KR)

( * ) Notice: Subject to any disclaimer, the term of this patent is extended or adjusted under 35 U.S.C. 154(b) by 0 days.

(21) Appl. No.: 09/455,157

(22) Filed: Dec. 6, 1999

(30) Foreign Application Priority Data

Jun. 5, 1999 (KR) .......................................... 99-20862
Dec. 3, 1999 (KR) .......................................... 99-54714

(51) Int. Cl.[7] ................................................ H04N 7/12
(52) U.S. Cl. .................................... 375/240.08; 348/43
(58) Field of Search ....................... 375/240.08, 240.26, 375/240.29; 348/42–43, 51, 425.1; 345/419; 382/154

(56) References Cited

U.S. PATENT DOCUMENTS

| 6,043,838 A | * | 3/2000 | Chen ............................ 348/42 |
| 6,057,884 A | * | 5/2000 | Chen et al. .................. 348/416 |
| 6,108,005 A | * | 8/2000 | Starks et al. ................ 345/419 |
| 2001/0045979 A1 | * | 11/2001 | Matsumoto et al. .......... 348/43 |

OTHER PUBLICATIONS

Man Bae Kim et al., "Stereoscopic Conversion Technique of 2–D Video and its Application", Chunchon Multimedia Conference, Feb. 25–26, 1999, pp. 93–98, and English–language Abstract.

Man Bae Kim et al., "On the Implementation of Ross Phenomenon for Stereoscopic Conversion of 2–D Video", Workshop Publication Papers on Image Processing and its Understanding, 11 pages, Feb. 4–5, 1999, and English–language Abstract.

Man Bae Kim, "The Conversion of MPEG Video to 3–D Stereoscopic Video", Journal of Telecommunications and Information, 13 pages, vol. 3, Jan. 1999, and English–language Abstract.

(List continued on next page.)

*Primary Examiner*—Vu Le
(74) *Attorney, Agent, or Firm*—Roylance, Abrams, Berdo & Goodman, L.L.P.; Joseph J. Buczynski

(57) ABSTRACT

A stereoscopic image generation apparatus generates a stereoscopic image using MPEG encoded data containing I, B and P pictures. A picture extractor extracts each picture data from the MPEG encoded data. A motion vector generator generates motion vectors individually corresponding to macroblocks in the picture and supplies the generated motion vectors to a motion vector field former. A picture storing unit stores pictures reproducted from the encoded picture data by the picture number K. A motion type determiner determines a motion type corresponding to a current picture using the motion vectors supplied from the motion vector field former. A stereoscopic image generator generates a mixed picture corresponding to the current picture using the previous pictures stored in the picture storing unit and the motion type determined in the motion type determiner and outputs the current picture and the mixed picture. A left/right picture determiner receives the current picture and the mixed picture output from the stereoscopic image generator and determines the received current picture into one of the left picture and the right picture forming a stereoscopic image and the mixed picture into the other thereof. Here, the motion type of the picture is determined as one of a still picture, a non-horizontal motion picture, a horizontal motion picture, and a fast motion picture, generates an optimal stereoscopic image adaptively to each determined motion type, determines the left/right picture of the stereoscopic image, thereby obtaining a natural and stable stereoscopic sense even in a variety of motion types of a picture.

40 Claims, 18 Drawing Sheets

OTHER PUBLICATIONS

Man Bae Kim, "Video Processing of MPEG Compressed Data for 3D Stereoscopic Conversion", 1998' Korean Broadcasting Engineering Society Study Meeting, 10 pages, Dec. 5, 1998, cover sheet and pp. 1–8, and English–language Abstract.

Tseng et al., "Multiviewpoint video coding with MPEG–2 compatibility", IEEE Trans. on Circuits and Systems for Video Technology, vol. 6, iss. 4, Aug. 1996, pp. 414–419.*

* cited by examiner

| UPPER-LEFT | UPPER-RIGHT |
|---|---|
| LOWER-LEFT | LOWER-RIGHT |

T1

T2

T3

T4

T5

METHOD AND APPARATUS FOR GENERATING STEROSCOPIC IMAGE USING MPEG DATA

BACKGROUND OF THE INVENTION

1. Field of the Invention

The present invention relates to a method for generating a stereoscopic image and an apparatus therefor, and more particularly, to a method for generating a stereoscopic image efficiently and an apparatus therefor, in which the stereoscopic image having a natural and stable stereoscopic sense which is adaptive to a variety of motion types of a picture is generated and a motion vector of each of I, P and B pictures is extracted and generated from a MPEG (Moving Picture Experts Group) bitstream.

Although a stereoscopic camera adopting two cameras is not used, the present invention enables two-dimensional motion images corresponding to MPEG-1 CD (compact disc), MPEG-2 HDTV (high definition TV) or MPEG-2 DVD (digital versatile disc) to be viewed directly as stereoscopic images. Furthermore, commercial applications of the present invention cover all fields that enable video pictures to be viewed as stereoscopic images. In more particular, the present invention can be applied to analog type video signal fields such as NTSC, PAL and SECAM broadcasting systems as well as all fields using MPEG data.

2. Description of the Related Art

As one prior art technology compared with the present invention, a modified time difference (hereinafter referred to as MTD) method has been developed by SANYO DENKI Co., Ltd., in Japan. Also, a method of converting a vertical parallax into a horizontal parallax has been developed by SAMSUNG ELECTRONICS Co., Ltd., in Korea. These prior art technologies generate stereoscopic images from analog type image signals. The MTD method developed by SANYO DENKI Co., Ltd. 1) extracts a moving area, 2) determines a velocity and direction of motion, 3) determining a delay direction and a delay time from a previous frame based on the velocity and direction of motion, and 4) determining whether a delay image delayed according to the determined delay direction and delay time is viewed through which eye of the right and left eyes.

The method of converting a vertical parallax into a horizontal parallax developed by SAMSUNG ELECTRONICS Co., Ltd., 1) predicts a motion block by block, 2) calculates a magnitude of a block motion vector, 3) converts the magnitude value obtained by 2) into a horizontal parallax value in order to convert all vertical components into horizontal parallax values, 4) moves each block by the horizontal parallax values in the horizontal direction, and 5) generates a mixed picture by gathering the horizontally moved blocks.

However, since one of the previous K frames is selected as a delay image forcedly by motion information in the case of the above-described MTD method, different depths possessed by areas in one frame are neglected. As a result, since a sense of depth does not exist when a stereoscopic image is viewed, a stereoscopic sense exists with respect to a moving object but does not exist with respect to a portion having less movement, for example, a background of a picture.

In the case of the method proposed by SAMSUNG ELECTRONICS Co., Ltd., a distortion of an image occurs due to a horizontal movement of each block in accordance with a difference of a horizontal parallax between neighboring blocks. Accordingly, a natural and stable stereoscopic image cannot be generated adaptively to a variety of motion types of an image.

Thus, in the case of the stereoscopic images generated by the above-described existing methods, a stereoscopic sense cannot be obtained in particular motion types of an image, or a motion of the stereoscopic image is not natural.

In addition, the above-described existing methods should perform a motion prediction method again with respect to a decoded image when a stereoscopic image is generated using MPEG encoded data. Accordingly, motion information contained in a MPEG bitstream is not used. As a result, algorithm and hardware for generating steroscopic images becomes complicated due to the reuse of the motion prediction method.

SUMMARY OF THE INVENTION

To solve the above problems, it is an object of the present invention to provide a method for generating an optimal stereoscopic image having a natural and stable stereoscopic sense even in a variety of motion types of an image.

It is another object of the present invention to provide an apparatus for generating an optimal stereoscopic image having a natural and stable stereoscopic sense even in a variety of motion types of an image.

It is still another object of the present invention to provide a method for efficiently generating an optimal stereoscopic image having a natural and stable stereoscopic sense even in a variety of motion types of an image, by using encoded MPEG data.

It is yet another object of the present invention to provide an apparatus for efficiently generating an optimal stereoscopic image having a natural and stable stereoscopic sense even in a variety of motion types of an image, by using encoded MPEG data.

To accomplish the object of the present invention, there is provided a stereoscopic image generation method for generating a stereoscopic image from image data, the method comprising the steps of: (a) determining a motion type of a current picture into one of a still picture, a non-horizontal motion picture, a horizontal motion picture and a fast motion picture, using motion vectors in each picture according to the image data; (b) generating a mixed picture corresponding to the current picture using previous pictures according to the image data and the determined motion type and outputting the current picture and the mixed picture; and (c) receiving the output current picture and the mixed picture and determining the current picture into one of the left picture and the right picture forming a stereoscopic image and the mixed picture into the other thereof, in accordance with the motion type determined in step (a).

To accomplish another object of the present invention, there is also provided a stereoscopic image generation apparatus for generating a stereoscopic image from image data, the apparatus comprising: a motion type determiner for determining a motion type of a current picture into one of a still picture, a non-horizontal motion picture, a horizontal motion picture and a fast motion picture, using motion vectors in each picture according to the image data; a stereoscopic image generator for generating a mixed picture corresponding to the current picture using previous pictures according to the image data and the determined motion type and outputting the current picture and the mixed picture; and a left/right picture determiner for receiving the current picture and mixed picture output from the stereoscopic image generator and determining the current picture into one of the left picture and the right picture forming a stereoscopic image and the mixed picture into the other thereof, in accordance with the motion type determined in the motion type determiner.

To accomplish still another object of the present invention, there is also provided a stereoscopic image generation method for generating a stereoscopic image using MPEG encoded data containing I, B and P pictures, the method comprising the steps of: (a) receiving the encoded picture data and generating and storing motion vectors corresponding to macroblocks in the picture; (b) storing pictures reproducted from the encoded picture data by the number K of pictures; (c) determining a motion type corresponding to a current picture using the motion vectors stored in step (a); (d) generating a mixed picture corresponding to the current picture using the previous pictures stored in step (b) and the motion type determined in step (c) and outputting the current picture and the mixed picture; and (e) receiving the current picture and the mixed picture output from step (d) and determining the current picture into one of the left picture and the right picture forming a stereoscopic image and the mixed picture into the other thereof.

To accomplish yet another object of the present invention, there is also provided a stereoscopic image generation apparatus for generating a stereoscopic image using MPEG encoded data containing I, B and P pictures, the apparatus comprising: a motion vector generation and storing unit for receiving the encoded picture data and generating and storing motion vectors corresponding to macroblocks in the picture; a picture storing unit for storing pictures reproducted from the encoded picture data by the number K of pictures; a motion type determiner for determining a motion type corresponding to a current picture using the motion vectors stored in the motion vector generation and storing unit; a stereoscopic image generator for generating a mixed picture corresponding to the current picture using the previous pictures stored in the picture storing unit and the motion type determined in the motion type determiner and outputting the current picture and the mixed picture; and a left/right picture determiner for receiving the current picture and the mixed picture output from the stereoscopic image generator and determining the current picture into one of the left picture and the right picture forming a stereoscopic image and the mixed picture into the other thereof.

Preferably, the motion vector generation step and the motion vector generator analyzes a header in a GOP (group of picture) of a MPEG encoded bitstream, to extract I, B and P pictures and extracts and generate motion vectors according to macroblocks of each picture to form a motion vector field.

Here, it is preferable that the motion vectors of the B picture and the P picture are extracted, interpolated and generated by macroblocks from the MPEG bitstream corresponding to a corresponding picture, and the motion vectors of the I picture intra-coded are generated using the motion vectors according to the macroblocks of the previous B pictures.

Preferably, the motion type determining step and the motion type determiner analyzes the motion vector field of the current picture, to determine the motion type of the current picture into one of a still picture having no movement, a non-horizontal motion picture in which a camera and/or an object moves in the non-horizontal direction, a horizontal motion picture in which a camera and/or an object moves in the horizontal direction, and a fast motion picture having fast movement.

Here, it is preferable that the step of determining the motion type of the picture into one of the still picture and the motion picture, analyzes the motion vector field of the picture and determines the motion type on the basis of a ratio occupied by the still macroblocks whose horizontal motion component and vertical motion component are all zeroes among the entire macroblocks of the picture.

Here, it is preferable that the step of determining the motion type of the picture into one of the non-horizontal motion picture and the horizontal motion picture, analyzes the motion vector field of the picture and determines the motion type on the basis of a ratio occupied by non-horizontal macroblocks based on a maximum vertical fusion threshold angle and a maximum horizontal parallax threshold value among the entire macroblocks of the picture.

Here, it is preferable that the step of determining the motion type of the picture into one of the fast motion picture and the horizontal motion picture, analyzes the motion vector field of the picture and determines the motion type on the basis of a ratio occupied by fast motion macroblocks based on a maximum horizontal parallax threshold value among the entire macroblocks of the picture.

Preferably, the stereoscopic image generator comprises at least one of a mixed still picture generator for generating a stereoscopic image of the current picture determined into the still picture, a mixed non-horizontal motion picture generator for generating a stereoscopic image of the current picture determined into the non-horizontal motion picture, a mixed fast motion picture generator for generating a stereoscopic image of the current picture determined into the fast motion picture, and a mixed horizontal motion picture generator for generating a stereoscopic image of the current picture determined into the horizontal motion picture.

Here, the stereoscopic image generating step corresponding to the current picture determined as a still picture allocates depth information differently from each other based on a brightness of predetermined each block in the still picture and/or the standard deviation thereof, converts the allocated depth information into a horizontal parallax, and generates a mixed picture corresponding to the still picture.

Here, it is preferable that the step of generating a stereoscopic image corresponding to the current picture determined as a non-horizontal motion picture, allocates each parallax value differently from each other between a macroblock whose direction is same as a camera motion direction and the former whose direction is not same as the latter, to thereby generate a mixed picture, in the case that both the camera and the object move in the non-horizontal motion picture. It is preferable that the step of generating a stereoscopic image corresponding to the current picture determined as a non-horizontal motion picture, allocates each parallax value differently from each other between motion macroblocks and still macroblocks, to thereby generate a mixed picture, in the case that only the object moves in the non-horizontal motion picture. It is preferable that the step of generating a stereoscopic image corresponding to the current picture determined as a non-horizontal motion picture, obtains each parallax value corresponding to each current macroblock by using motion vectors of a peripheral edge macroblock according to an edge feature of the current macroblock and a previous picture macroblock to thereby generate a mixed picture, in the case that only the camera moves in the non-horizontal motion picture.

Here, it is preferable that the step of generating a stereoscopic image corresponding to the current picture determined as a fast motion picture, converts the motion vectors of the fast motion macroblocks in the current picture into a maximum horizontal parallax value, moves the converted result in the horizontal direction, and mixes the horizontally moved result with a just previous picture, to thereby generate a mixed picture corresponding to the fast motion picture.

Here, it is preferable that the step of generating a stereoscopic image corresponding to the current picture determined as a horizontal motion picture, determines a previous picture based on a psychophysics-theory-based maximum horizontal parallax threshold value and a predetermined horizontal motion value in the current picture into a mixed picture corresponding to the horizontal motion picture.

Preferably, the left/right picture determining step and the determiner selects a mode A in which the current picture is determined as a left picture and the previous picture is determined as a right picture or a mode B in which the current picture is determined as a right picture and the previous picture is determined as a left picture, adaptively based on a motion type of a camera and/or an object in the horizontal motion picture, in the case that a motion type of the current picture is determined as a horizontal motion picture, to thereby determining a left picture and a right picture forming a stereoscopic image. In the case that the motion type of the current picture is not a horizontal motion picture, it is preferable that the current picture is determined as a left picture and the mixed picture is determined as a right picture.

Here, it is preferable that the determination of a mode A or a mode B in correspondence to the current picture determined as a horizontal motion picture, bisects the current picture into a first decision area being an edge area and a second decision area being a central area and is based on each horizontal motion vector direction of the each macroblock belonging to each of the first and second decision areas, the number and the distribution of the macroblocks.

Preferably, the stereoscopic image generating method and apparatus according to the present invention redetermines the motion type of the current picture primarily determined at the motion type determiner adaptively based on the each combination of motion type of the previous picture and the motion vectors corresponding to the current picture, in order to remarkably decrease a tremble between the stereoscopic images which are temporally successive, and thus performs generation of the stereoscopic image and/or determination of the left/right picture.

BRIEF DESCRIPTION OF THE DRAWINGS

The above objects and other advantages of the present invention will become more apparent by describing the preferred embodiments thereof in more detail with reference to the accompanying drawings in which.

DETAILED DESCRIPTION OF THE PREFERRED EMBODIMENTS

Preferred embodiments of the present invention will be described with reference to the accompanying drawings.

Figure 1:
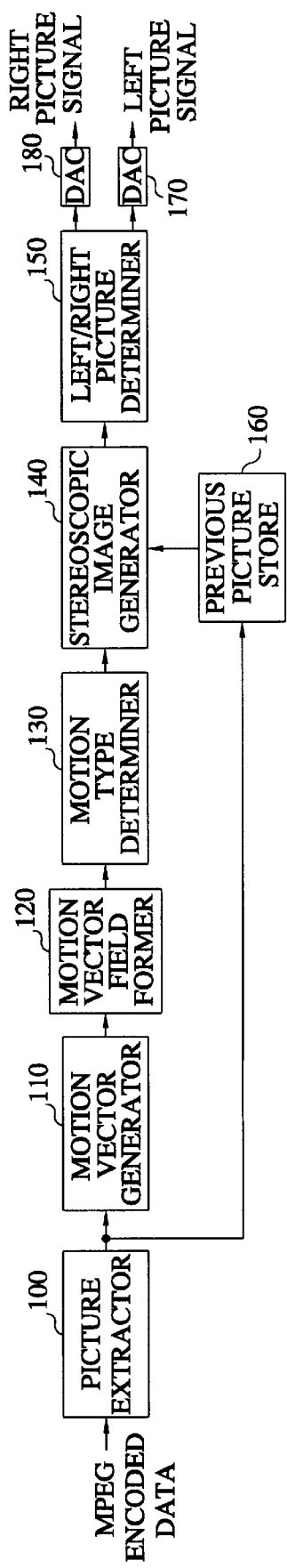
FIG. 1 is block diagram showing a stereoscopic image generation apparatus for MPEG data according to a preferred embodiment of the present invention.
Figure 2:
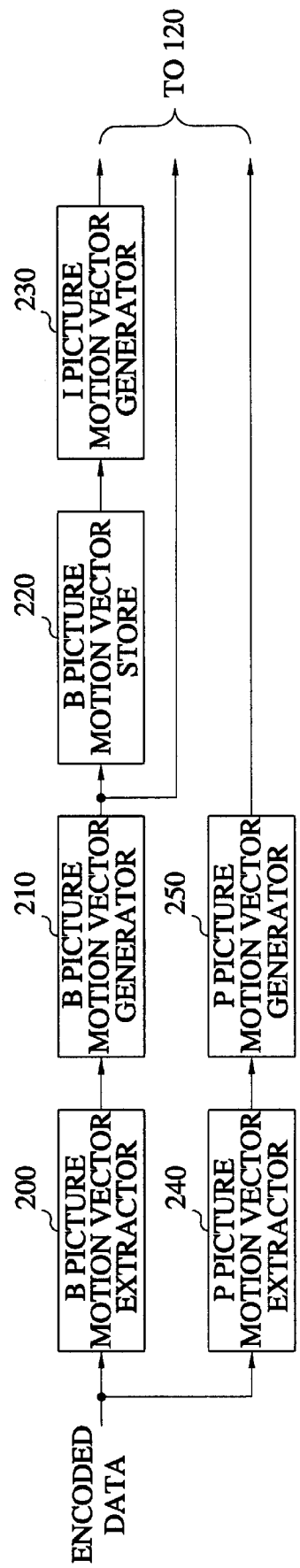
FIG. 2 is a block diagram showing the structure of the motion vector generator in detail.

FIG. 1 is block diagram showing a stereoscopic image generation apparatus for MPEG data according to a preferred embodiment of the present invention. The apparatus shown in FIG. 1 includes a picture extractor 100, a motion vector generator 110, a motion vector field former 120, a motion type determiner 130, a stereoscopic image generator 140, a left/right picture determiner 150, a previous picture store 160 and digital-to-analog converters (DACs) 170 and 180.

The picture extractor 100 recognizes the kind of a picture using a 3-bit code in a picture header of an input bitstream when the bitstream of MPEG encoded data is input. The 3-bit code in the picture header indicates the kind of a frame picture or a field picture. For example, if the 3-bit code is 001, the picture is an I picture. If the 3-bit code is 010, the picture is a P picture. If the 3-bit code is 100, the picture is a B picture. The picture extractor 110 extracts I, P and B picture data from a MPEG encoded bitstream, and supplies the picture data to the motion vector generator 110 and the previous picture store 160.

The motion vector generator 110 extracts a motion vector of each macroblock in the I, B and P pictures from the bitstream and generates a motion vector with reference to data of the other pictures for the macroblocks having no motion vector. Since the I picture is intra-coded, no motion vector exists in the I picture. Thus, a motion vector is extracted using the motion vector of a previous B picture. Since the P and B pictures are inter-coded, they have their own motion vector. Thus, a motion vector can be obtained using the existing motion vector extraction method of MPEG standards.

In the case that M is three, a picture sequence of a GOP in an original image input to a MPEG encoder is as follows.

... $B_0 \; B_1 \; P_2 \; B_3 \; B_4 \; I_5 \; B_6 \; B_7 \; P_8 \; B_9 \; B_{10} \; P_{11}$ ...

Otherwise, a picture sequence of a GOP in an image input to a MPEG decoder follows an encoding sequence as follows.

... $P_2 \; B_0 \; B_1 \; I_5 \; B_3 \; B_4 \; P_8 \; B_6 \; B_7 \; P_{11} \; B_9 \; B_{10}$ ...

The encoder performs an backward motion prediction using $I_5$ with respect to the pictures $B_3$ and $B_4$. Thus, in order to extract a macroblock motion vector of a picture $I_5$, the motion vectors of the previous pictures $B_3$ and $B_4$ obtained in the encoder are used. Table 1 shows a display sequence of the I, B and P pictures in the MPEG standards which is a sequence of an original image and a decoder input sequence which is a sequence of the encoded image.

$$(d_{Bx}, d_{By})^s = \frac{1}{M-2}(d_{Bx}, d_{By})^f + \frac{1}{M-1}(d_{Bx}, d_{By})^r \quad (1)$$

Here, two motion vectors $(d_{Bx}, d_{By})^f$ and $(d_{Bx}, d_{By})^r$ are extracted simultaneously or selectively from a particular macroblock which is bidirectionally predicted. The motion vector $(d_{Bx}, d_{By})^s$ which has been scaled by the equation 1 includes all of a forward interframe predictive encoding type, a backward interframe predictive encoding type and a bidirectionally predicted interpolating interframe predictive encoding type, among the macroblock types in the B picture. The motion vector $(d_{Bx}, d_{By})^s$ which is obtained by the equation 1 becomes a motion vector value of a corresponding macroblock which is used in the present invention.

Likewise, the motion vector of the scaled $B_4$ can be obtained by the following equation 2.

$$(d_{Bx}, d_{By})^s = \frac{1}{M-1}(d_{Bx}, d_{By})^f + \frac{1}{M-2}(d_{Bx}, d_{By})^r \quad (2)$$

Meanwhile, the motion vectors of the macroblocks having no motion vector according to the intracoding in the B picture are generated using an interpolation method. Since the interpolation method can be apparently understood by one who has an ordinary skill in the art who understands well the technological concept of the present invention, the detailed description thereof will be omitted.

TABLE 1

| | | | | | | | | | | | | | | | | |
|---|---|---|---|---|---|---|---|---|---|---|---|---|---|---|---|---|
| (a) | B | B | P | B | B | I | B | B | P | B | B | P | B | B | P | B | B |
| | 0 | 1 | 2 | 3 | 4 | 5 | 6 | 7 | 8 | 9 | 10 | 11 | 12 | 13 | 14 | 15 | 16 |
| (b) | P | B | B | I | B | B | P | B | B | P | B | B | P | B | B | I | B |
| | 2 | 0 | 1 | 5 | 3 | 4 | 8 | 6 | 7 | 11 | 9 | 10 | 14 | 12 | 13 | 17 | 15 |

An item (a) indicates a display sequence of the MPEG pictures, and an item (b) indicates a decoder input sequence of the MPEG pictures.

When a B picture is extracted in the picture extractor 100, the B picture motion vector extractor 200 extracts a motion vector in every macroblock from a bitstream corresponding to the corresponding B picture. The B picture motion vector generator 210 scales the extracted macroblock motion vectors in the manner to be described later, and generates motion vectors of the macroblocks having no motion vector due to an intracoding, for example, a forced intracoding in the B picture, using an interpolation method.

First, a method of scaling the macroblock motion vectors extracted from the B picture bitstream will be described below. The B picture motion vector generator 210 scales the extracted macroblock motion vectors considering N and M, in which N is the number of frames consisting of the GOP and M is a picture interval between the I/P picture and the P picture. Assuming that M=3, in the item (a) of Table 1, $B_3$ is distant by a one-picture interval from a forward predicted $P_2$ and distant by a two-picture interval from a backward predicted $I_5$. Meanwhile, $B_4$ is distant by a two-picture interval from a forward predicted $P_2$ and distant by a one-picture interval from a backward predicted $I_5$. The motion vector of $B_3$ which is scaled considering a picture interval M can be obtained as the following equation 1.

The motion vectors corresponding to all macroblocks in the B picture which has been scaled or interpolated in the B picture motion vector generator 210 are stored in the B picture motion vector store 220 and input to the motion vector field former 120 of FIG. 1.

When a P picture is extracted in the picture extractor 100, the P picture motion vector extractor 240 extracts motion vectors of the macroblocks in the P picture from the bitstream. The macroblocks in the P picture are forward-interframe-predictive encoded and intracoded with the previous I picture or P picture in the encoder. Therefore, among all the macroblocks in the P picture, the macroblock type of the motion vector extracted from the P picture motion vector extractor 240 becomes a forward predictive coding type and a macroblock type having no extracted motion vector is an intracoding type.

The P picture motion vector generator 250 scales the macroblock motion vectors extracted from the bitstream corresponding to the P picture in the manner to be described later, as in the case of the B picture. The motion vectors of the macroblocks having no motion vectors according to the intra-coding in the P picture are generated using an interpolation method.

In particular, in the motion vector scaling of the P picture, a picture interval M between the P picture and the motion predictive previous I/P picture, which is used to predict the motion vector of the P picture in the encoder, should be taken into consideration. This is because a constant amount of movement is maintained between the pictures prior to or after a stereoscopic image generation to be described later.

Thus, the scaled motion vector of the macroblock of the P picture can be obtained as in the following equation 3 considering the picture interval M.

$$(d_{Px}, d_{Py})^s = \frac{1}{M}(d_{Px}, d_{Py}) \quad (3)$$

Here, the scaled motion vector $(d_{Px}, d_{Py})^s$ is scaled for the motion vector $(d_{Px}, d_{Py})$ which is forward predicted between the previous I/P picture and the current P picture, considering a constant picture interval M which is used in the predictive encoding in the encoder.

The motion vectors corresponding to all macroblocks in the P picture which has been scaled or interpolated in the P picture motion vector generator 215 are input to the motion vector field former 120 of FIG. 1.

The motion vectors stored in the B picture motion vector store 220 are used to enable the I picture motion vector generator 230 to generate the motion vectors corresponding to the macroblocks in the I picture. Since all the macroblocks in the I picture are intra-coded, no motion vector exists. Thus, in order to generate the motion vector of the I picture, it should be awaited until the motion vectors of all the macroblocks in the backward motion predictive B picture are obtained in the B picture motion vector extractor 200 and the B picture motion vector generator 250, with reference to the I picture, in the encoder. The motion vector $(d_x, d_y)_I$ of each macroblock in the I picture can be obtained as follows.

As can be seen from the sequence of Table 1, the motion vector of $I_5$ having no motion vector can be obtained using the previous P and B pictures having motion information in the bitstream.

Referring to Table 1, the I picture motion vector generator 230 uses the previous pictures $B_3$ and $B_4$ to obtain the motion vectors of $I_5$, which is most preferable for minimization of the time delay and insurance of the reliability. This is based on the fact that the pictures $B_3$ and $B_4$ have been predictively encoded directly with reference to the picture $I_5$ in the encoder and are proximate temporarily. For example, although the pictures $P_2$, $B_0$ and $B_1$ are earlier in time than the pictures $B_3$ and $B_4$ in Table 1, the encoder does not refer to the picture $I_5$ directly. Accordingly, the reliability is lowered. The pictures $P_8$, $B_6$ and $B_7$ are later in a decoder input sequence and a display sequence than the pictures $B_3$ and $B_4$ and thus a delay time increases, although the encoder refers to the picture $I_5$ directly. Thus, considering all of the reference in the encoder, the decoder input sequence and the display sequence, it is most preferable that the motion vectors of $I_5$ are obtained using the motion vectors of the $B_3$ and $B_4$.

Therefore, it is preferred that the I picture motion vector generator 230 according to the present invention generates a motion vector using the backward predicted B pictures just before any I picture. The detailed method is proposed in the following three kinds.

Method 1: Use of a Weight Value Considering a Direction

First, the motion vector of $B_4$ which is input to the decoder late in time is used as it is, to obtain the motion vector of $I_5$. However, this method can be used only under the assumption that all macroblocks move linearly. Also, since the macroblocks of the I picture referred to by the macroblocks of the B picture are not aligned accurately in units of a macroblock, the obtained motion vector value is not the motion vector value of a desired macroblock.

Figures 3, 4:
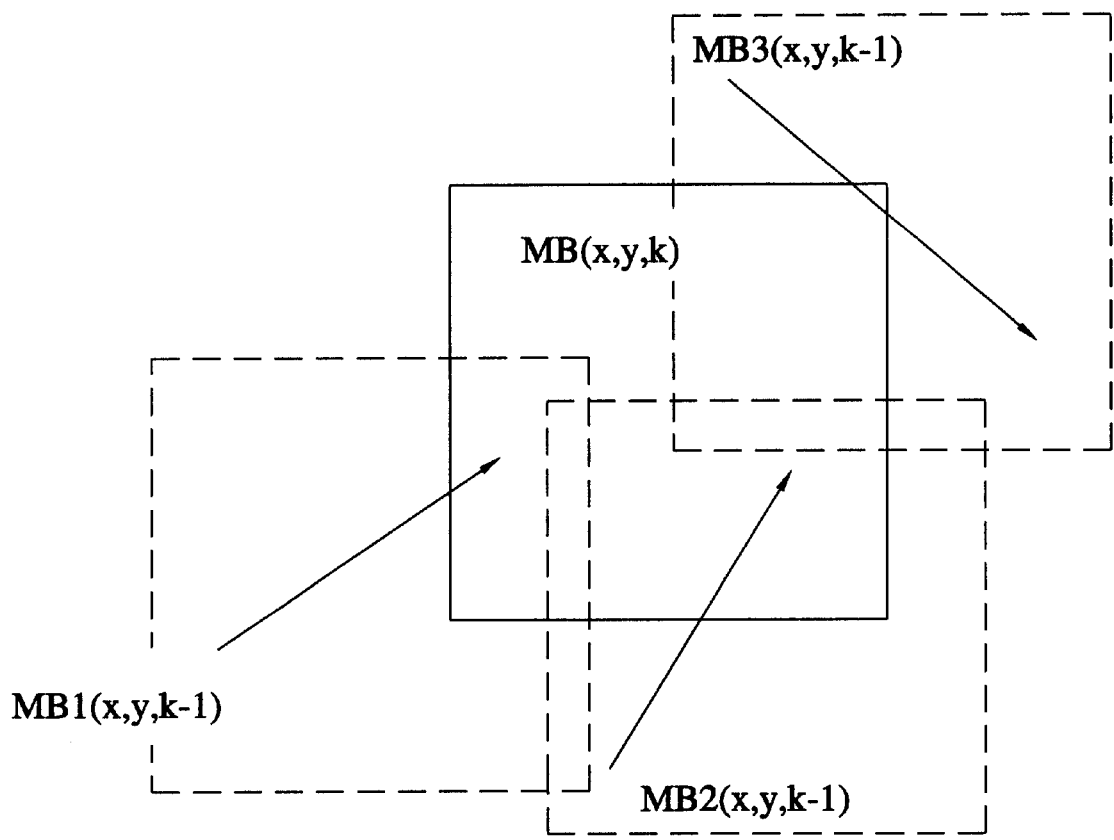
FIG. 3 shows overlapping of a B picture macroblocks overlapped with an I picture macroblock.
FIG. 4 shows direction of a motion vector which is used to generate an I picture motion vector.

Thus, after a block is moved by the motion vector value of the B picture which can be used, the information of the B picture macroblocks overlapped with the current macroblock of the I picture is used to calculate a value of the motion vector of macroblock of the I picture. In FIG. 3, MB(x, y, k-1) denotes the macroblocks of the B picture which is a previous picture having a motion vector, and MB(x, y, k) denotes the macroblocks of the I picture with which a current motion vector is obtained. Since an arrow mark indicates the direction of the motion vector, MB1 and MB2 have a similar motion vector to each other but MB3 has a different motion vector. Therefore, as in MB3, the macroblocks whose motion vector direction differs from entire motion vector direction do not include their candidates. Accordingly, the motion vector which is obtained from an area having a small correlation can be avoided. Also, since the directions of the motion vector can exist in various ways, it is preferable that they are classified into four areas as shown in FIG. 4. Also, when a motion vector is defined as $(d_x, d_y)$, the direction of the motion vector can be calculated using the following equation 4, and the calculated direction is classified into one of upper-left, upper-right, lower-left and lower-right as shown in FIG. 4.

$$\text{Direction of motion vector} = \tan^{-1}\left(\frac{d_y}{d_x}\right) \quad (4)$$

The motion vector of the I picture is obtained as follows. $F_k$ and $F_{k-1}$ denote a current picture and a previous picture, respectively. N means the number of the B picture macroblocks overlapped at least partially with the macroblock MB(x, y, k) of the I picture to be desired to obtain the motion vector and the B pictuere macroblocks whose motion vector direction is similar to each other. $l_n = [l_{xn}, l_{yn}]^T$ means the number of pixels corresponding to the length of a portion overlapped with MB(x, y, k) on the x-axis and the y-axis. The weight value $\omega = [\omega_x, \omega_y]^T$ for $l_n = [l_{xn}, l_{yn}]^T$ is obtained using the following equation 5.

$$(w_{xi} w_{yi})^T = \left(\frac{l_{xi}}{\sum_{i=1}^{N} l_{xi}}, \frac{l_{yi}}{\sum_{i=1}^{N} l_{yi}}\right)^T \quad (i = 1, \ldots, N) \quad (5)$$

Here, T is a transpose.

Then, the motion vector of the I picture is obtained as in the following equation 6, using the weight value obtained in the equation 5.

$$\begin{pmatrix} d_{Ix}(k) \\ d_{Iy}(k) \end{pmatrix} = \begin{pmatrix} \sum_{i=1}^{N} w_{xi} d_{Bxi}(k-1) \\ \sum_{i=1}^{N} w_{yi} d_{Byi}(k-1) \end{pmatrix} \quad (6)$$

Method 2: Use of Weight Value on Each of the X-axis and Y-axis

The calculation method using only weight value is same as the method 1 except for the direction considered in the method 1. That is, only macroblocks having the motion vector of the particular direction are not considered, but all macroblocks overlapped are considered to thereby obtain the motion vector of the I picture.

Method 3: Use of an Area as a Weight Value

The method 3 is same as the method 2, in which the weight value is not obtained with respect to each of the x-axis and the y-axis, but an area of all macroblocks overlapped with the macroblock to be desired, that is, the number of pixels is regarded as a weight value, to calculate the motion vector of the I picture.

The motion vectors of all the macroblocks within the I picture which is generated by one of the above-described methods are supplied to the motion vector field former 120.

The motion vector field former 120 forms a motion vector field composed of motion vectors corresponding to all macroblocks in the each picture if the motion vectors of the macroblocks in the I, B and P pictures are obtained. The motion vector field is expressed as an array or a set. Here, the concept of a field is distinguished from a field which is one of the kinds of the pictures.

Figure 5:
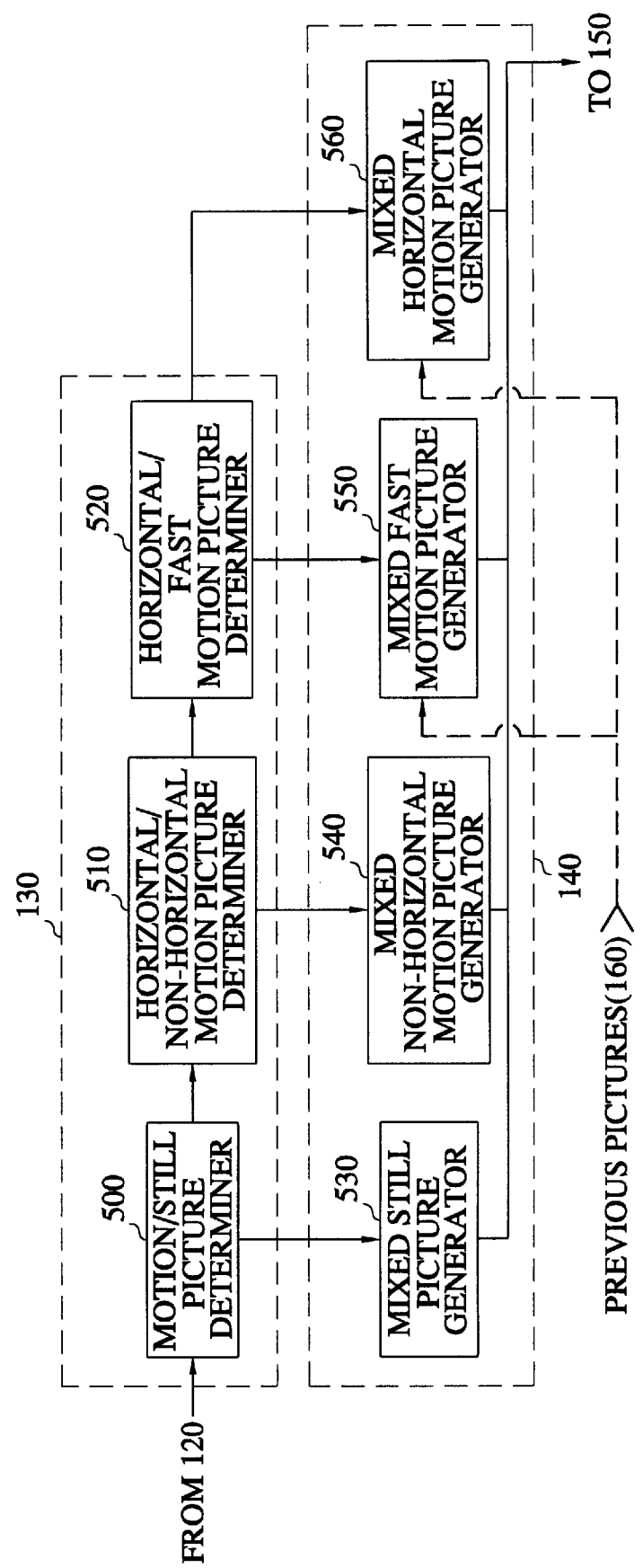
FIG. 5 is a block diagram showing the detailed structure of the motion type determiner and the stereoscopic image generator.

If the motion vector field is formed, the motion type determiner 130 applies a motion analysis method to the picture-by-picture motion vector fields which are stored in the motion vector field former 120 or output therefrom, determines the motion type of the current picture into one of a variety of motion types, and outputs the result to the stereoscopic image generator 140. Here, the above-described motion types are classified into a still picture having no movement, a non-horizontal motion picture in which a camera and/or an object moves in the non-horizontal direction, a fast motion picture having fast movement, and a horizontal motion picture in which a camera and/or an object moves in the horizontal direction. The motion type determiner 130 includes a motion/still picture determiner 500, a horizontal/non-horizontal motion picture determiner 510, and a horizontal/fast motion picture determiner 520, as shown in FIG. 5. A mixed still picture generator 530, a mixed non-horizontal motion picture generator 540, a mixed fast motion picture generator 550, and a mixed horizontal motion picture generator 560, all of which are shown in FIG. 5 forms the stereoscopic image generator 140 shown in FIG. 1.

Figure 6:
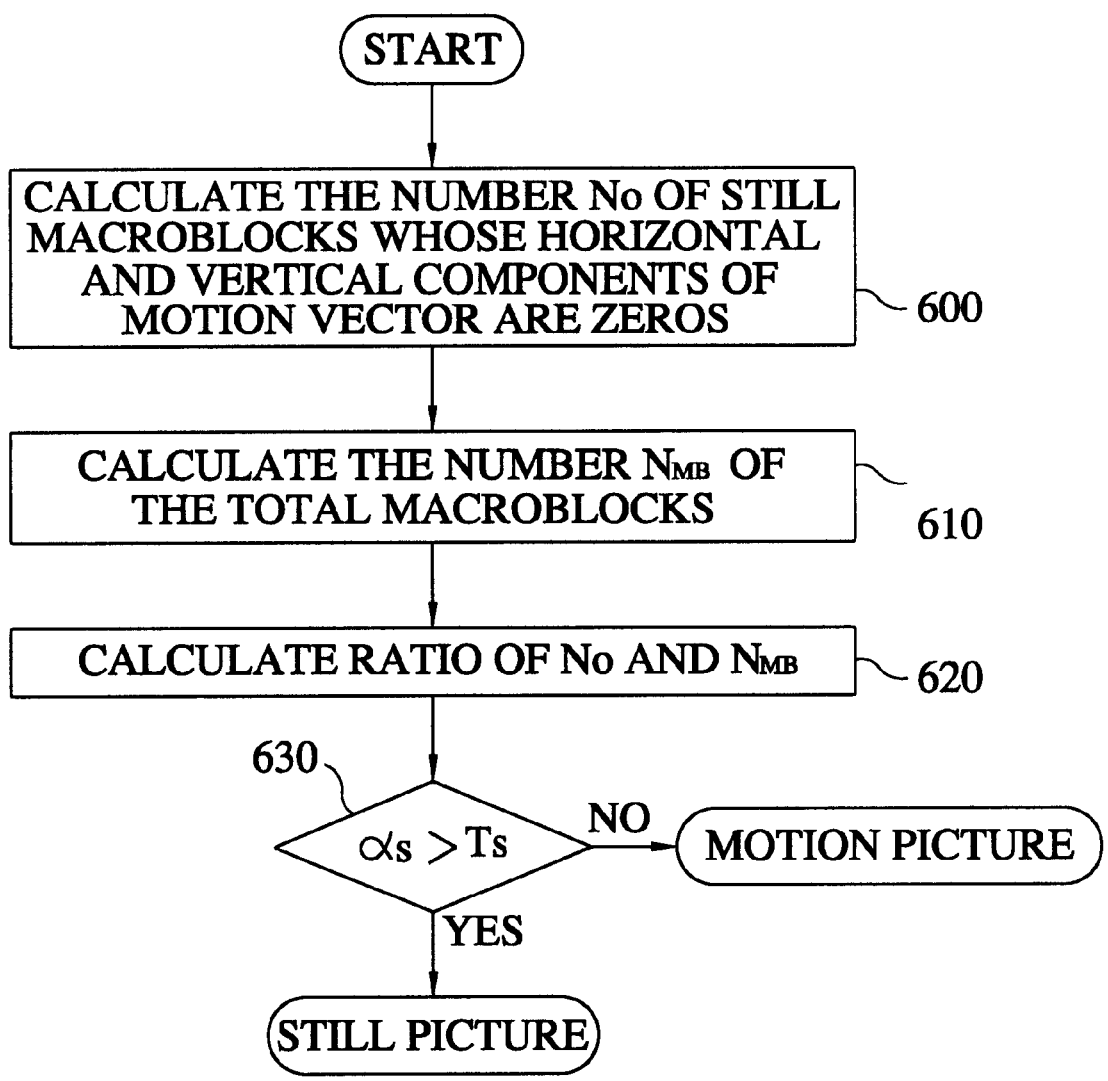
FIG. 6 is a flow-chart view for explaining determination of a still picture and a motion picture.

The operation of the motion/still picture determiner 500 shown in FIG. 5 will be described below with reference to FIG. 6. The motion/still picture determiner 500 analyzes the motion vector field and determines the current picture into one of the still picture and the motion picture. Referring to FIG. 6, the motion/still picture determiner 500 calculates the number $N_0$ of the macroblocks whose horizontal component and vertical component are all zeros, that is, the macroblocks whose motion vectors are all (0, 0) which are referred to as still macroblocks, among the motion vectors $(d_x, d_y)$ of the current picture (step 600), calculates the number of $N_{MB}$ of the total macroblocks in the current picture (step 610), and obtains a ratio $\alpha_s$ of the still macroblock number $N_0$ with respect to the total macroblock number $N_{MB}$ in the picture, using the following equation 7 (step 620). Also, the still macroblock includes "NO-MC" macroblocks applied in the MPEG encoding, that is, macroblocks whose motion compensation (MC) is not performed.

$$\alpha_s = \frac{N_0}{N_{MB}} \tag{7}$$

Then, the motion/still picture determiner 500 determines the motion type of the current picture into a still picture if a value of $\alpha_s$ obtained in step 620 is greater than a threshold value $T_S$, and determines the motion type of the current picture into a motion picture if the former is not greater than the latter (step 630). Here, a threshold value $T_S=[0.0, 1.0]$. For example, in the case that $T_S=0.9$, a current picture is determined as a still picture if the area of the still macroblocks is above 90% of the total area and determined as a motion picture if not. In the result of discrimination of step 630, if the motion type of the current picture is a still picture, data of the current picture containing the motion vector is input to the mixed still picture generator 530, and if the former is a motion picture, the latter is input to the horizontal/non-horizontal motion picture determiner 510.

Figure 7:
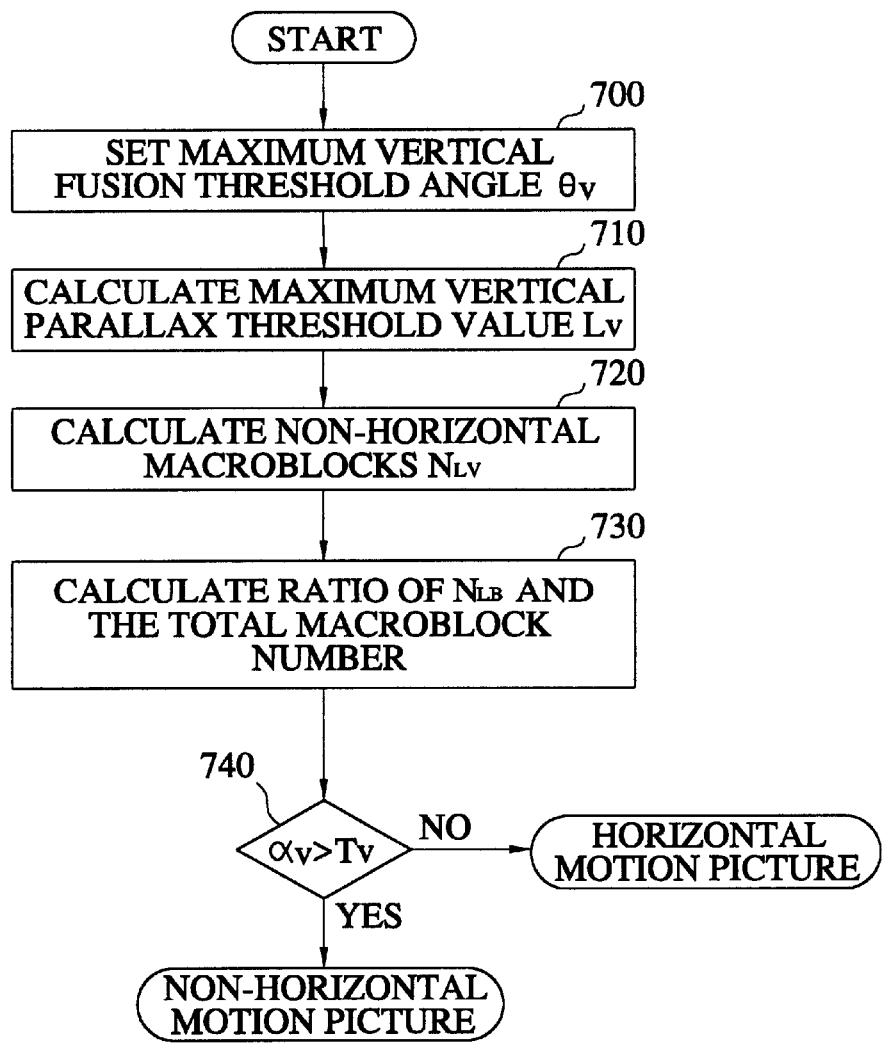
FIG. 7 is a flow-chart view for explaining determination of a non-horizontal motion picture and a horizontal motion picture.
Figure 8:
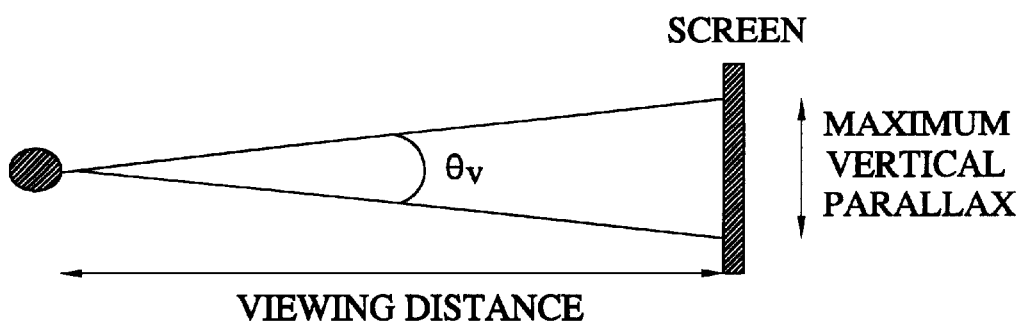
FIG. 8 shows the relationship between a maximum vertical fusion threshold angle and a maximum vertical parallax.

The operation of the horizontal/non-horizontal motion picture determiner 510 shown in FIG. 5 will be described below with reference to FIGS. 7 and 8. The horizontal/non-horizontal motion picture determiner 510 determines the motion type of the current picture into one of a non-horizontal motion picture and a horizontal motion picture, based on a psychophysics theory.

According to the psychophysics theory known to the art, if an image moves only in the horizontal direction, a sense of depth of image occurs due to a horizontal parallax of both eyes. Meanwhile, a vertical parallax due to a non-horizontal movement is a difference between two matching points each of which is called a homologous point. It is known that the vertical parallax makes it very difficult and inconvenient for both eyes to perform a fusion of an image. By the psychophysics experiment, the magnitude of the vertical parallax which makes a fusion of an image possible has been measured as a maximum vertical fusion threshold angle $\theta_v$, which should be within 10' (minutes of arc) at least in angle. By the other experiment, $\theta_v$ should satisfy the vertical parallax of 6' in angle, and after the fusion of the image has been performed, it has been observed that the image is stably fused although $\theta_v$ becomes 20'.

Thus, in step 700, any value ranging from 6' to 20' is set as a maximum vertical fusion threshold angle $(\theta_v)$. A distance Lv at a display monitor corresponding to $\theta_v$ is a maximum vertical parallax threshold value, which can be obtained using the following equation 8 in connection with the relationship of FIG. 8 (step 710).

$$L_V = 2 \cdot D \cdot \tan\left(\frac{\theta_v}{60 \cdot 2}\right) \cdot \left(\frac{N_y}{W_y}\right) \tag{8}$$

Here, since a unit of $\theta_v$ is a minute, it should be divided by 60 in order to represent it in degree. A unit of the maximum vertical parallax threshold value $L_V$ is a pixel. D is a visible distance in units of cm. $N_y$ is a vertical magnitude of a picture in units of a pixel. $W_y$ is a vertical length of a picture on a display monitor in units of cm.

If $L_V$ which is a very crucial factor for determining a non-horizontal motion of a picture is obtained in step 710, the number $N_{LV}$ of the macroblocks which are referred to as non-horizontal macroblocks in which the magnitude of the vertical component $d_y$ of the motion vector in the current picture is greater than $L_V$ is calculated (step 720), and a ratio $\alpha_v$ of the non-horizontal macroblock number $N_{LV}$ with respect to the total macroblock number $N_{MB}$ is obtained using the following equation 9 (step 730).

$$\alpha_v = \frac{N_{LV}}{N_{MB}} \tag{9}$$

The horizontal/non-horizontal motion picture determiner 510 determines the motion type of the current picture as a non-horizontal motion picture if the ratio $\alpha_v$ of the current picture obtained in step 730 is greater than the threshold value $T_V$ and determined as a horizontal motion picture if not (step 740).

The $\alpha_v$ and $T_V$ are very crucial factors for determining whether the motion type of the current picture is a horizontal motion picture or a non-horizontal motion picture. Even a small object which moves in the non-horizontal direction in an actual stereoscopic image affects a stereoscopic sense. Thus, the number of the non-horizontal macroblocks in the picture determines $\alpha_v$. By experiment, it has been observed that a non-horizontal object motion at the state where a camera stops makes the eyes of people more fatigued than at the state where the camera moves. This is because a difference between parallaxes of a still area and a motion area in a picture is large in the former case and is relatively small in the latter case. Thus, it is preferred that the threshold value $T_V$ of $\alpha_v$ is set 0.05 at the state where the camera stops, and is set 0.15 at the state where the camera moves. In the result of the discrimination of step 740, if the motion type of the current picture is a non-horizontal motion picture, the data of the current picture containing the motion vector is supplied to the mixed non-horizontal motion picture generator 530, and otherwise to the horizontal/fast motion picture determiner 520.

Figure 9:
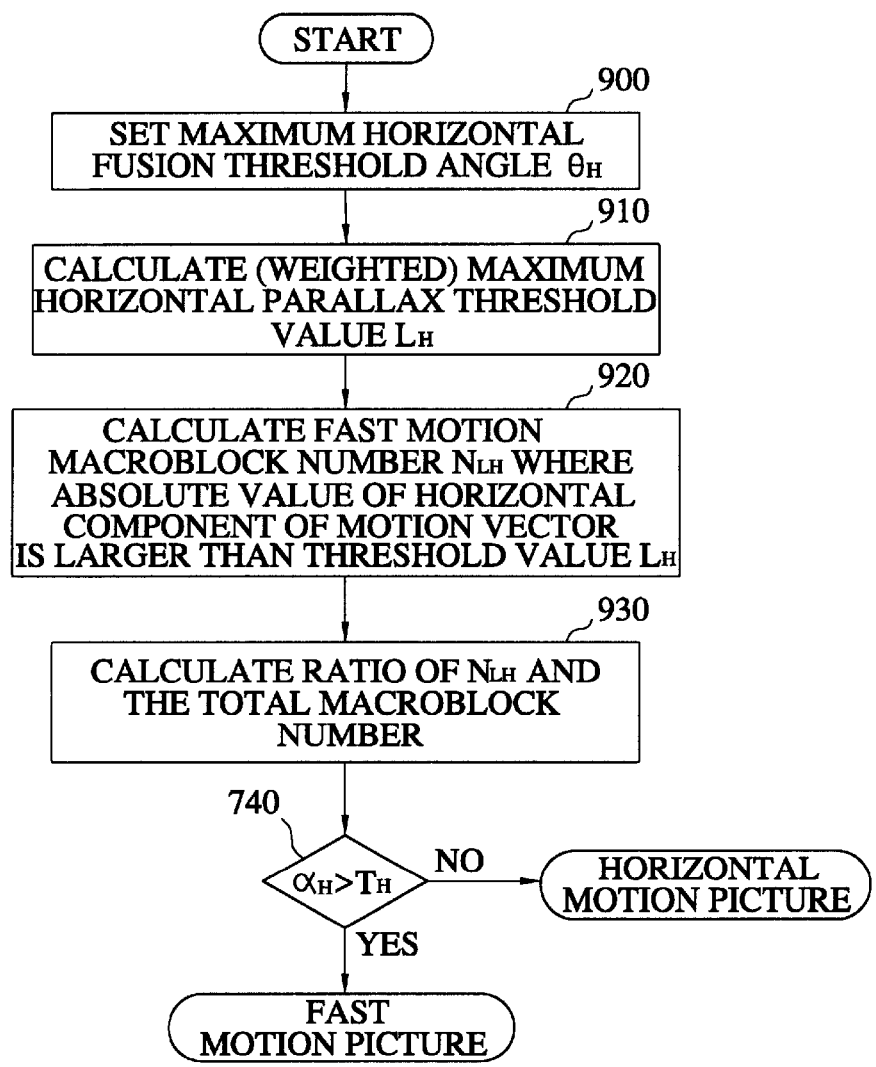
FIG. 9 is a flow-chart view for explaining determination of a fast motion picture.

The operation of the horizontal/fast motion picture determiner 520 shown in FIG. 5 will be described below with reference to FIGS. 9 and 10. The horizontal/fast motion picture determiner 520 determines the motion type of the current picture as one of the fast motion picture having fast movement and the horizontal motion picture having non-fast movement.

First, the horizontal/fast motion picture determiner 520 determines a maximum horizontal parallax value which does not fatigue the human's eyes. By the psychophysics experiments, an horizontal fusion threshold angle $\theta_H$ is approximately 27' in angle at a negative parallax or crossed disparity, and is 24' in angle at a positive parallax or uncrossed disparity. Also, it appeared that a convergence response of a human's vision for an interval of time of about two seconds is larger than the values 27' and 24' of the parallax. Here, since the concepts of the negative parallax or crossed disparity and the positive parallax or uncrossed disparity are known to one skilled in the art, the detailed description thereof will be omitted. Also, it proved that a horizontal fusion threshold angle which can be converged by the stereoscopic eyes of the human is approximately 4.93° at the negative parallax, and is approximately 1.57° at a positive parallax.

Figure 10:
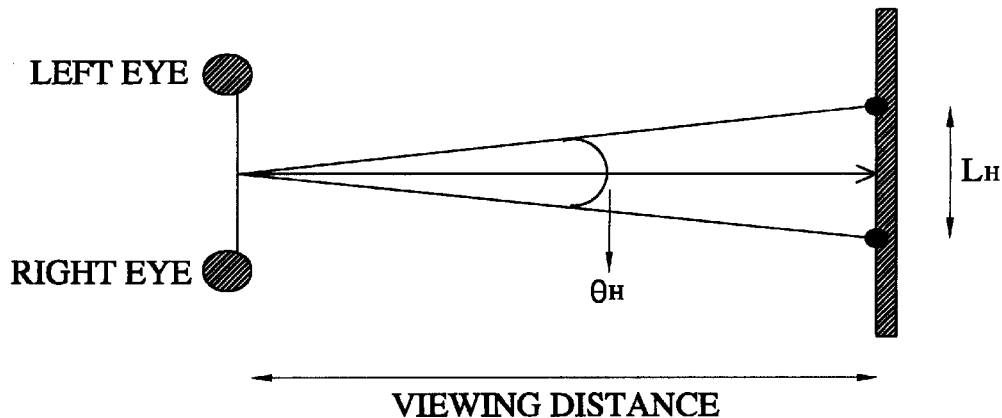
FIG. 10 shows the relationship between a maximum horizontal fusion threshold angle and a maximum horizontal parallax.

Thus, the horizontal fusion threshold angle $\theta_H$ is set as the above-described values (step 900), and thus a maximum horizontal threshold value $L_H$ at the display monitor is obtained by the following equation 10, using the relationship of FIG. 10 (step 910).

$$L_H = 2 \cdot D \cdot \tan\left(\frac{\theta_H}{2}\right) \cdot \left(\frac{N_x}{W_x}\right) \tag{10}$$

Here, D is a viewing distance between the human eyes and a screen. $N_x$ denotes the horizontal magnitude of a picture, and $W_x$ denotes the horizontal length of the picture on a display monitor, both of which units are cm.

Here, since the maximum horizontal parallax threshold value $L_H$ obtained by the equation 10 is a fusible maximum threshold value without fatiguing the human eyes, it is more preferable that a weight value is assigned thereto. Thus, the maximum horizontal parallax threshold value which is crucial factor for determining the fast movement of the picture is calculated using the equation 11 to which the weight value is assigned with respect to the horizontal fusion threshold angles 1.57° and 4.93° (step 910).

$$L_H = 2 \cdot D \cdot \left[\omega_1 \tan\left(\frac{1.57°}{2}\right) + \omega_2 \tan\left(\frac{4.93°}{2}\right)\right] \cdot \left(\frac{N_x}{W_x}\right) \tag{11}$$

Here, $\omega_1 + \omega_2 = 1$. If two weight values $\omega_1$ and $\omega_2$ are both ½, the maximum horizontal parallax threshold value $L_H$ obtained by the equation 11 becomes an average value with respect to the horizontal fusion threshold angles 1.57° and 4.93°.

Then, the horizontal/fast motion picture determiner 520 determines a fast moving portion or portions which makes or make the fusion of the image difficult in the current picture which moves in the horizontal direction. This determination method is based on the psychophysics theory. In more detail, the horizontal/fast motion picture determiner 520 calculates the number $N_{LH}$ of the macroblocks whose absolute value of the horizontal component $d_x$ is larger than $L_H$ obtained by the equation 11 (hereinafter referred to as fast motion macroblocks), among the motion vectors of the macroblocks in the current picture (step 920), and a ratio $\alpha_H$ of the fast motion macroblock number $N_{LH}$ with respect to the total macroblock number $N_{MB}$ in the picture is obtained using the following equation 12 (step 930).

$$\alpha_H = \frac{N_{LH}}{N_{MB}} \tag{12}$$

The horizontal/fast motion picture determiner 520 compares the ratio $\alpha_H$ of the current picture obtained in step 930 with the threshold value $T_H$, determines the motion type of the current picture as a fast motion picture if the ratio $\alpha_H$ of the current picture is greater than the threshold value $T_H$ in the result of comparison, and determined as a horizontal motion picture if otherwise(step 940). Here, the threshold value $T_H$ is a value between 0.0 and 1.0.

The horizontal/fast motion picture determiner 520 supplies the data of the current picture containing the motion vector to the mixed fast motion picture generator 550 if the motion type of the current picture is a fast motion picture, and supplies the former to the mixed horizontal motion picture generator 560 if the latter is a horizontal motion picture.

Then, the operation of the mixed horizontal motion picture generator 560 shown in FIG. 5 will be described below with reference to FIGS. 11 and 12. If the motion type of the current picture is determined as a horizontal motion picture at the horizontal/fast motion picture determiner 520, the mixed horizontal motion picture generator 560 obtains a delay factor from the current picture and determines the previous picture corresponding to the delay factor as a mixed horizontal motion picture. Then, the mixed horizontal motion picture generator 560 analyzes the motion kind of a camera and/or an object in the current picture which is a horizontal motion picture, and determines whether the current picture and determined previous picture will be viewed to which eye of the left and right eyes according to the analyzed motion kind.

Figure 11:
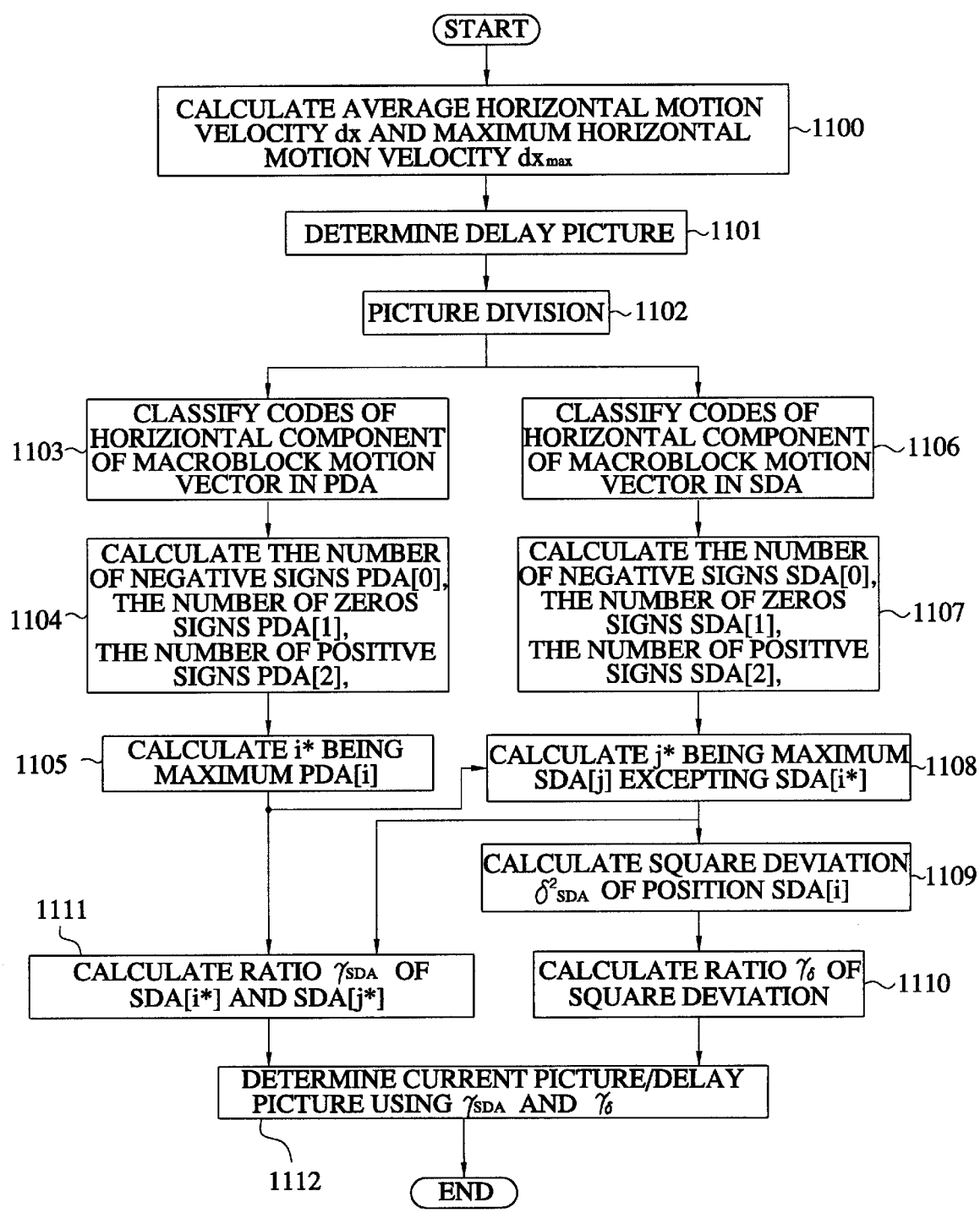
FIG. 11 is a flow-chart view for explaining a method of converting a horizontal motion picture into a stereoscopic image.
Figure 12:
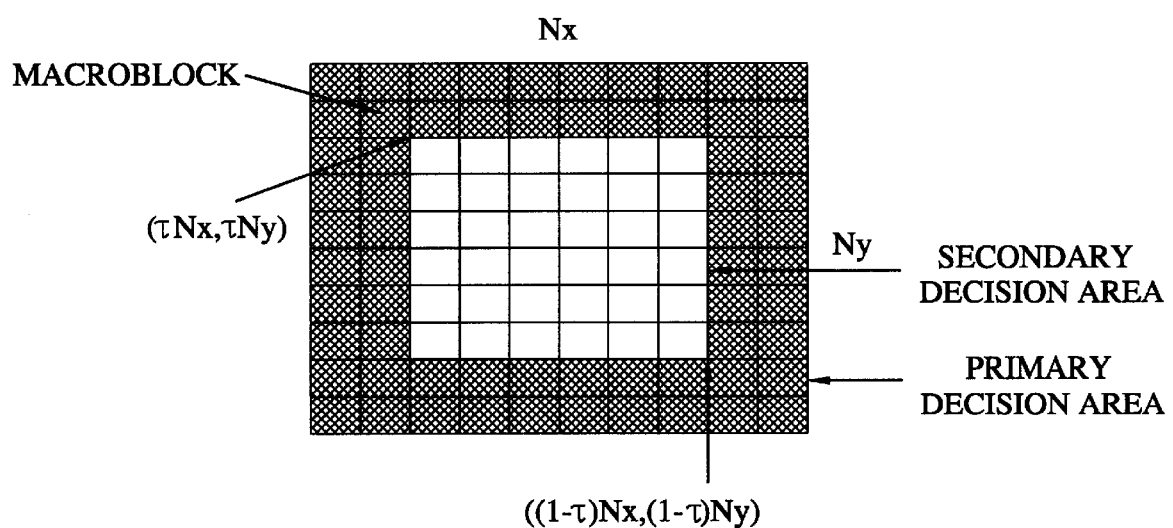
FIG. 12 shows that a picture area is divided into a primary decision area and a secondary decision area.

Referring to FIG. 11, the mixed horizontal motion picture generator 560 calculates an average horizontal motion velocity or a maximum horizontal motion velocity of the current picture being the horizontal motion picture (step 1100). The average horizontal motion velocity is an average of the absolute value of all horizontal motion vector components in which the value of the horizontal component $d_x$ of the motion vector in the current picture is not zero, and is obtained by the following equation 13.

$$\overline{d_x} = \frac{1}{N} \sum_{i=1}^{N} |d_{xi}| \quad (13)$$

Here, N is the number of the macroblocks in which the value of the horizontal component $d_x$ of the motion vector in the current picture is not zero. The maximum horizontal motion velocity $dx_{max}$ is a maximum horizontal motion vector component and is obtained by the following equation 14.

$$dx_{max} = \max_i |d_{xi}|, \, i = 1, 2, \ldots, N \quad (14)$$

Then, the mixed horizontal motion picture generator 560 determines a delay picture corresponding to the current picture, that is, a previous picture forming a stereoscopic image together with the current picture being the horizontal motion picture (step 1101). In step 1101, a maximum horizontal motion value $dx_{max}$ and a maximum horizontal parallax threshold value $L_H$ are compared with each other, to thereby determine a previous picture. In order to form a stereoscopic image using $L_H$ obtained in step 910 of FIG. 9, one of the previous frames should be selected. In order to determine this, a delay factor is calculated. In the case that the motion type of the current picture is a horizontal motion picture, the current picture and the delay picture forming the stereoscopic image should be viewed to the left eye and the right eye appropriately. The delay picture is selected as one of K previous pictures which are earlier in time on the time axis from the current picture. The delay factor for determining the delay picture is obtained using the average horizontal motion velocity or the maximum horizontal motion velocity of the current picture. The former has a demerit in which a macroblock affects a stereoscopic sense greatly, while the latter has a merit in which all horizontal parallaxes are determined smaller than the maximum horizontal parallax threshold value. Therefore, it is preferable that a previous picture for a stereoscopic image of the horizontal motion picture is determined based on the maximum horizontal motion velocity. The current picture is defined as $I_k$, and the previous pictures are defined as $I_{k-n}$ (n=1,2, . . . ,∞). If the horizontal motion velocity is fast, a previous picture close to the current picture is selected, while if the horizontal motion velocity is slow, a previous picture far from the current picture is selected, using the delay factor. A delay factor $f_D$ is obtained by the following equation 15.

$$f_D = \text{ROUND} \left[ \frac{L_H}{dx_{max}} \right] \quad (15)$$

Here, since the maximum horizontal motion value $dx_{max}$ of the horizontal motion picture is not greater than the maximum horizontal parallax threshold value $L_H$, the minimum value of the delay factor $f_D$ is 1. ROUND[ ] is a round operator. In the case of a small amount of the horizontal motion, since a value of a denominator in the following equation 15 becomes small, a value of the delay factor $f_D$ becomes large.

A memory is needed to store the previous pictures. Since the capacity of the memory is limited, the maximum value of $f_D$ is K. The memory stores K previous pictures in which the magnitude of K is determined adaptively based on $L_H$. If the delay factor $f_D$ is obtained by the above-described method, the previous picture used for forming a stereoscopic image is determined based on the delay factor.

If step 1101 is completed, the mixed horizontal motion picture generator 560 forms a stereoscopic image with the current picture $I_k$ which moves in the horizontal direction and the delayed previous picture $I_{k-fD}$ corresponding to the current picture. Here, in the case that the current picture is a horizontal motion picture, it is most preferable to form a stereoscopic image with the current picture and the delayed previous picture.

Meanwhile, in the case that the motion type of the current picture is a horizontal motion picture, it is determined whether the current picture and the delayed previous picture both of which form a stereoscopic image will be viewed adaptively to which eye of both eyes according to the motion kinds of a camera and/or an object in the current picture. Here, there are two types of the methods of determining the current picture as one of the left picture and the right picture. The first method is a method for determining the current picture as the left picture and the previous picture as the right picture, which is referred to as a mode "A" hereinafter. The second method is a method for determining the current picture as the right picture and the previous picture as the left picture, which is referred to as a mode "B" hereinafter. When a stereoscopic image of the horizontal motion picture is formed, it is very important to determine a mode "A" or a mode "B".

In more detail, the method for determining the above-described mode "A" or "B" according to the motion kind of the camera and/or the object in the current picture will be described with reference to FIGS. 11 and 12 and Tables 2 through 4.

TABLE 2

| Motion Kind | Camera motion | Object motion | Left motion | Right motion |
|---|---|---|---|---|
| ① | Right | None | Previous picture | Current picture |
| ② | Left | None | Current picture | Previous picture |
| ③ | None | Right | Current picture | Previous picture |
| ④ | None | Left | Previous picture | Current picture |
| ⑤ | Right | Right | Current picture | Previous picture |
| ⑥ | Right | Left | Previous picture | Current picture |
| ⑦ | Left | Left | Previous picture | Current picture |
| ⑧ | Left | Right | Current picture | Previous picture |
| ⑨ | Right | Left/Right | Previous picture | Current picture |
| ⑩ | Left | Left/Right | Previous picture | Current picture |

In order to select the mode "A" or the mode "B," the motion kind of the camera and/or the object in the current picture should be firstly determined using the horizontal component of the motion vector in the motion vector field of the current picture. The movement of the camera and/or the object existing in the current picture is classified into ten kinds of motion as shown in Table 2. In Table 2, there are the motion directions of the camera and/or the object according to each motion kind and the left picture and the right picture which are adaptively determined according to the classified motion kind. If the above-described ten kinds of motion are determined according to the analysis of the motion vector field, the current picture and the previous picture are finally displayed through the left eye/right eye or the right eye/left eye.

The motion kinds of Table 2 are again classified into a mode "A" and a mode "B" largely. The cases where the motion kinds are classified into the mode "A" are ② camera left motion, ③ object right motion, ⑤ camera right motion and object right motion, or ⑧ camera left motion and object right motion. The cases of the mode "A" are shown in the following Table 3.

The cases where the motion kinds are classified into the mode "B" are ① camera right motion, ④ object left motion, ⑥ camera right motion and object left motion, ⑦ camera left motion and object left motion, ⑨ camera right motion and objects in left and right motion, or ⑩ camera left motion and objects in left and right motion. The cases of the mode "B" are shown in the following Table 4.

TABLE 3

| Motion Kind | PDA (1st direction) | SDA (2nd direction) | Camera motion | Object motion |
|---|---|---|---|---|
| ② | + | + | Left | None |
| ③ | 0 | + | None | Right |
| ⑤-b | − | 0 | Right | Right |
| ⑤-c | − | + | Right | Right |
| ⑧ | + | + | Left | Right |

TABLE 4

| Motion kind | PDA (1st direction) | SDA (2nd direction) | Camera motion | Object motion |
|---|---|---|---|---|
| ① | − | − | Right | None |
| ④ | 0 | − | None | Left |
| ⑥ | − | − | Right | Left |
| ⑦-a | + | − | Left | Left |
| ⑦-b | + | 0 | Left | Left |

Thus, the present invention finds out a determining factor for classifying the motion vector field of a picture into the mode "A" or the mode "B." The motion vector field according to each motion kind is analyzed. If the motion direction of an object is right irrespective of the camera motion, the mode "A" is selected unconditionally. If the motion direction of an object is left irrespective of the camera motion, the mode "B" is selected unconditionally. In addition, if the camera is in the left motion state and the object have no motion state, the mode "A" is selected, while if the camera is in the right motion state and the object have no motion state, the mode "B" is selected.

Meanwhile, a specific method for determining the motion kinds of the camera and/or the object in the current picture will be described with reference to steps 1102 through 1112 of FIG. 11 and FIG. 12.

In the FIG. 11 flow-chart view, if a delay picture is determined in step 1101, the current picture is divided into a primary decision area (PDA) and a secondary decision area (SDA) (step 1102). The PDA is an area excluding an inner rectangular [$\tau N_x$, $(1-\tau)N_x$]×[$\tau Ny$,$(1-\tau)Ny$] from the total picture area shown in FIG. 12. The SDA is an area [$\tau N_x$, $(1-\tau)N_x$]×[$\tau Ny$,$(1-\tau)Ny$]. A range of a value of $\tau$ is [0.0,0.5]. The PDA determines a camera motion involved with movement of the entire picture, for example, movement of the background, and the SDA determined the motion of the camera and/or the object in the picture.

The horizontal motion vector component of the macroblocks in the PDA determining the camera motion direction has a negative sign, a zero sign and a positive sign. In step 1103, the horizontal motion component of each macroblock in the PDA is classified according to the sign of step 1103.

Then, the number of the negative signs, the number of zero signs and the number of the positive signs are calculated (step 1104). These numbers are defined as PDA[0], PDA[1] and PDA[2], respectively. The largest number among the PDA[0], PDA[1] and PDA[2] is defined as PDA[i*] (step 1105). Here, i*∈{0,1,2}. i* is a first direction in which the motion direction in the PDA to be used in Tables 3 and 4 is determined as one of '+', '0' and '−'. The result is used in step 1112 later.

Meanwhile, the SDA is analyzed, and thus the motion kinds of the object and/or the camera in the picture are analyzed into only object motion, only camera motion and both object and camera motion. First, the sign of the horizontal component of the macroblock motion vector contained in the SDA is classified (step 1106). Then, the number of the negative signs, the number of zero signs and the number of the positive signs are calculated (step 1107). These numbers are defined as SDA[0], SDA[1] and SDA[2]. Among them, a larger number of the two remaining numbers excluding the SDA[i*] corresponding to the PDA[i*] is selected, and is defined as SDA[j*] (step 1108). The j* is defined as a second direction. Also, a larger number of the two remaining numbers excluding the second direction is selected, and may be defined as a third direction.

In the SDA, the motions of the camera and the object can exist simultaneously. Thus, an accuracy with respect to the second direction is investigated. The second direction is assumed as an object motion initially. In the following step, it should be determined whether the second direction is a direction of the object motion or the camera motion. The following method has been used.

Firstly, in the SDA, a ratio $\gamma_{SDA}$ of the numbers existing in the first direction and the second direction is calculated by the following equation 16 (step 1111).

$$\gamma_{SDA} = \frac{SDA[j^{*|<}]}{SDA[i^{*|<}]} \qquad (16)$$

Secondly, a ratio $\gamma_\sigma$ of the square deviation a $\sigma_U^2$ at the time when the horizontal motion components are uniformly distributed at the horizontal distance [$\tau N_x$, $(1-\tau)N_x$] in the SDA, with respect to the square deviation $\sigma_{SDA}^2$ of the horizontal position values in the picture of the horizontal motion component contained in the second direction (calculation in step 1109) is calculated using the following equation 17 (step 1110).

$$\gamma_\sigma = \frac{\sigma_U^2}{\sigma_{SDA}^2} \qquad (17)$$

If $\gamma_{SDA}$ obtained in step 1111 is larger than the threshold value $T_\gamma$, and $\gamma_\sigma$ obtained in step 1110 is larger than 1, the second direction does not change, or the second direction can be replaced by the third direction if not. If the second direction points out '+' (right motion), or the first direction points out '−' (left motion) and the second direction points out '0' (still state), the mode "A" is selected based on the Table 3. In all the other cases, the mode "B" is selected based on Table 4 (step 1112).

In the case of the horizontal motion picture, if the mode "A" or the mode "B" is determined according to the motion kind of the camera and/or the object in the picture is determined in the left/right picture determiner 150 as described above, the current picture and the delayed previous picture are displayed as a stereoscopic image appropriate for both eyes.

The operation of the mixed non-horizontal motion picture generator 540 shown in FIG. 5 will be described below with reference to FIGS. 13 and 14. If the motion type of the current picture is determined as a non-horizontal motion picture in the horizontal/non-horizontal motion picture determiner 510, the mixed non-horizontal motion picture generator 540 generates a stereoscopic image adaptively according to the motion kind of the camera and/or the object in the current picture which is the non-horizontal motion picture.

Figure 13:
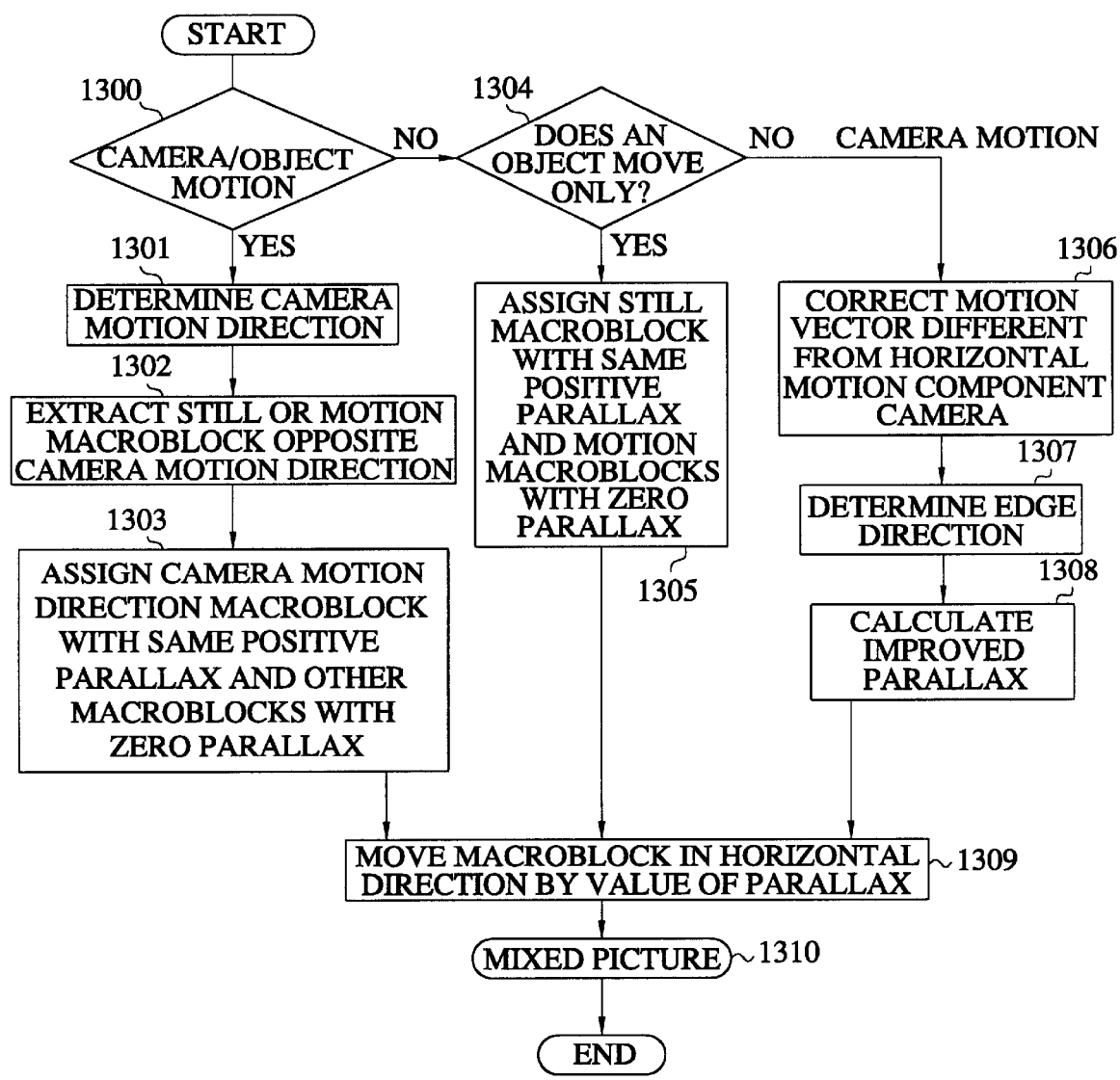
FIG. 13 is a flow-chart view for explaining a method of converting a non-horizontal motion picture into a stereoscopic image.
Figure 14:
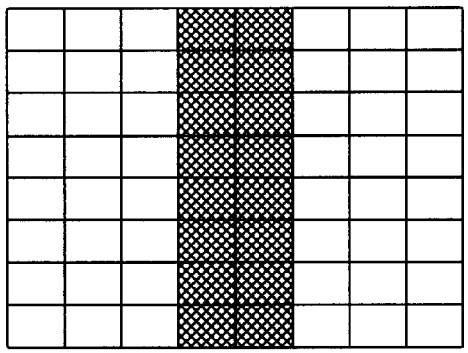
FIG. 14 shows directional filters T1–T5 which are used for determination of an edge direction.
Figure 14:
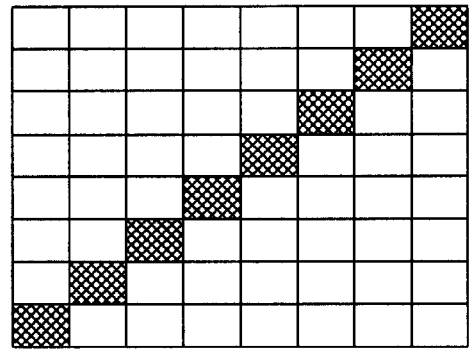
Figure 14:
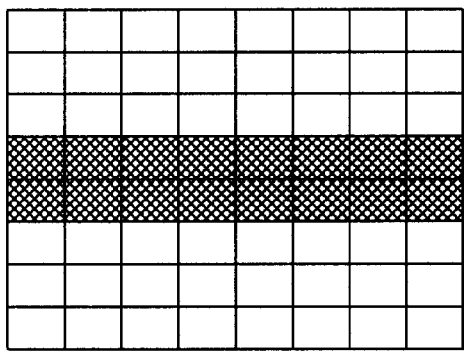
Figure 14:
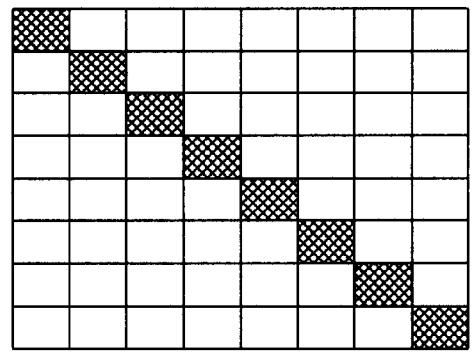
Figure 14:
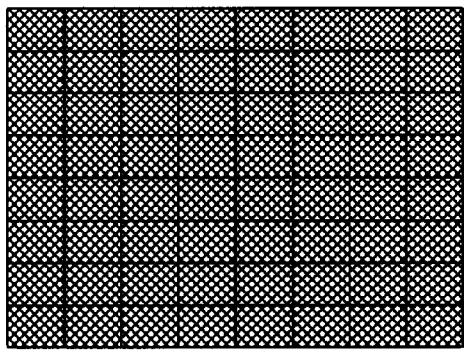

Referring to FIG. 13, the mixed non-horizontal motion picture generator 540 firstly judges the motion kind of the camera and/or the object in the current picture which is the non-horizontal motion picture, based on the method above described in the case of the horizontal motion picture.

In step 1300, if the current picture being the non-horizontal motion picture is determined as a picture where both the camera and the object move, the first direction obtained in step 1105 of FIG. 11 is determined as a camera motion direction (step 1301), to then extract still or motion macroblocks opposite the camera motion direction (step 1302). Then, the same positive parallax value is assigned to the macroblocks having the camera motion direction and a parallax of zero is assigned to the other macroblocks (step 1303). That is, the macroblocks in the current picture have a parallax of zero or a positive parallax of certain values. Then, the macroblock moves in the horizontal direction by the determined parallax value (step 1309), to thereby generate a mixed picture (step 1310).

In steps 1300 and 1304, if the current picture being the non-horizontal motion picture is determined as a picture where the camera is in the still state and only the object moves, the same positive parallax value is assigned to the still macroblocks and a parallax of zero is assigned to the motion macroblocks (step 1305). Then, the macroblock moves in the horizontal direction by the determined parallax value (step 1309), to thereby generate a mixed picture with respect to the non-horizontal motion picture (step 1310).

In steps 1300 and 1304, if the current picture being the non-horizontal motion picture is determined as a picture where the object is in the still state and only the camera moves, the motion vector different from the sign of the horizontal motion component of the camera is corrected (step 1306). In order to obtain an accurate motion vector, edge information is used. In step 1307, an edge direction of the macroblock is determined, which will be described with reference to FIG. 14 in more detail.

1) It is determined in the same manner as that of step 1105 of FIG. 11 whether the camera motion direction is left or right. The motion vector is corrected in the case that the horizontal motion vector component of the macroblock differs from the camera motion direction. For example, if the motion vector of any macroblock MB($n_1$, $n_2$) in the current picture differs from the camera motion direction, the motion vector of the corresponding macroblock MB($n_1$, $n_2$) is replaced by the motion vector of the previous macroblock MB($n_1$–1,$n_2$). MB($n_1$+1,$n_2$) is not used because of difficulty in its realization.

2) It is checked whether an edge exists in each macroblock in the current picture. At this time, five kinds of directional filters shown in FIG. 14 are used. An actual size of the macroblock is 16×16. However, for convenience of explanation, it is assumed as a size of 8×8. First, it is checked whether an edge exists in the macroblock, using T5. If a square deviation of the pixel value in the macroblock is larger than a threshold value T, an edge exists, and an edge does not exist if not. If an edge exists, a square deviation at T1, T2, T3 and T4 is obtained, respectively. An edge direction of a filter having the minimum value is determined as an edge direction of the corresponding macroblock. Thus, each macroblock in the current picture is classified into a non-edge MB and an edge MB, in which the edge MB has an edge direction. Since a vertical edge affects a stereoscopic sense largely, an edge macroblock having an edge direction among three macroblocks existing in a macroblock scan line just above the current macroblock is used as the current edge macroblock.

3) In the camera motion, the current picture is closely involved with the previous picture. Thus, when a motion parallax is obtained, the motion vector of the previous macroblock is taken into consideration.

In step 1308, the motion vector is converted into a parallax and the improved parallax value is calculated. The extracted motion vector of each macroblock is composed of a horizontal component and a vertical component. The vertical component of the motion vector causes a fatigue of the eyes due to a loss of the sense of depth when watching the stereoscopic image. therefore, the motion vector is converted into the horizontal parallax value in order to remove the vertical component of the motion vector.

The parallax conversion o f the motion vector uses the following three methods. If the motion vector of the macroblock is obtained, the norm $d_{MB}$ of the motion vector is obtained using the following equation 18, in order to remove the influence of the vertical motion component.

$$d_{MB} = \sqrt{d_x^2 + d_y^2} \tag{18}$$

Here, $d_x$ and $d_y$ are horizontal and vertical components of the macroblock motion vector.

Also, in order to reduce an amount of operation, the following equation 19 can be used.

$$d_{MB}=MAX\ (|d_x|,|d_y|) \tag{19}$$

Also, the following equation 20 can be used considering only the horizontal component.

$$d_{MB}=|d_x| \tag{20}$$

Here, the equation 20 can reduce an amount of operation.

In order to obtain a negative parallax, all macroblocks are moved in the horizontal direction to the right, to thereby mix a left picture. In case of a positive parallax, when watching a stereoscopic image, a 3-dimensional (3-D) depth of field occurs in the rear side on a screen. In order to obtain a positive parallax, an actual horizontal parallax is obtained using the following equation 21.

$$d_{MB}{}^+=MAX(d_{MB})-d_{MB} \tag{21}$$

Here, MAX($d_{MB}$) is a predetermined value or is determined as a maximum value of the motion norm of the macroblock in each picture.

Finally, in step 1308, the parallax improved using an edge can be obtained by using the following equation 22.

$$px(n_1, n_2) = w_1 \cdot d_{MB_k}(n_1, n_2) + w_2 \cdot d_{MB_{k-1}}(n_1, n_2) + \tag{22}$$

$$\sum_{i=1}^{1} \delta[(n_1, n_2), (n_1 - i, n_2 - 1)] \cdot$$

$$d_{MB_k}(n_1 - i, n_2 - 1)$$

Here, δ is a weight value of a edge direction difference between a macroblock of $(n_1,n_2)$ and that of $(n_1-i, n_2-1)$. If a difference of the edge direction difference is zero degree, a value of δ is 1, if the former is 45 degrees, the latter is ½, and if the former is 90 degrees, the latter is 0. Otherwise, a value of δ can be determined in a different method. $w_1$ and $w_2$ are weight values with respect to the parallax value between the current picture macroblock of $(n_1,n_2)$ and previous picture macroblock of $(n_1,n_2)$ and are determined at random. $MB_k$=means a macroblock of k-th picture. If the improved parallax value is obtained by the equation 22, the macroblock is moved by the parallax value in the horizontal direction (step 1309), to thereby a mixed picture for a stereoscopic image of the non-horizontal motion picture is generated (step 1310).

The operation of the mixed fast motion picture generator 550 shown in FIG. 5 will be described with reference to FIG. 15. If the motion type of the current picture is determined as a fast motion picture in the horizontal/fast motion picture determiner 520, the mixed fast motion picture generator 550 generates a mixed picture for a stereoscopic image corresponding to the fast motion picture.

Figure 15:
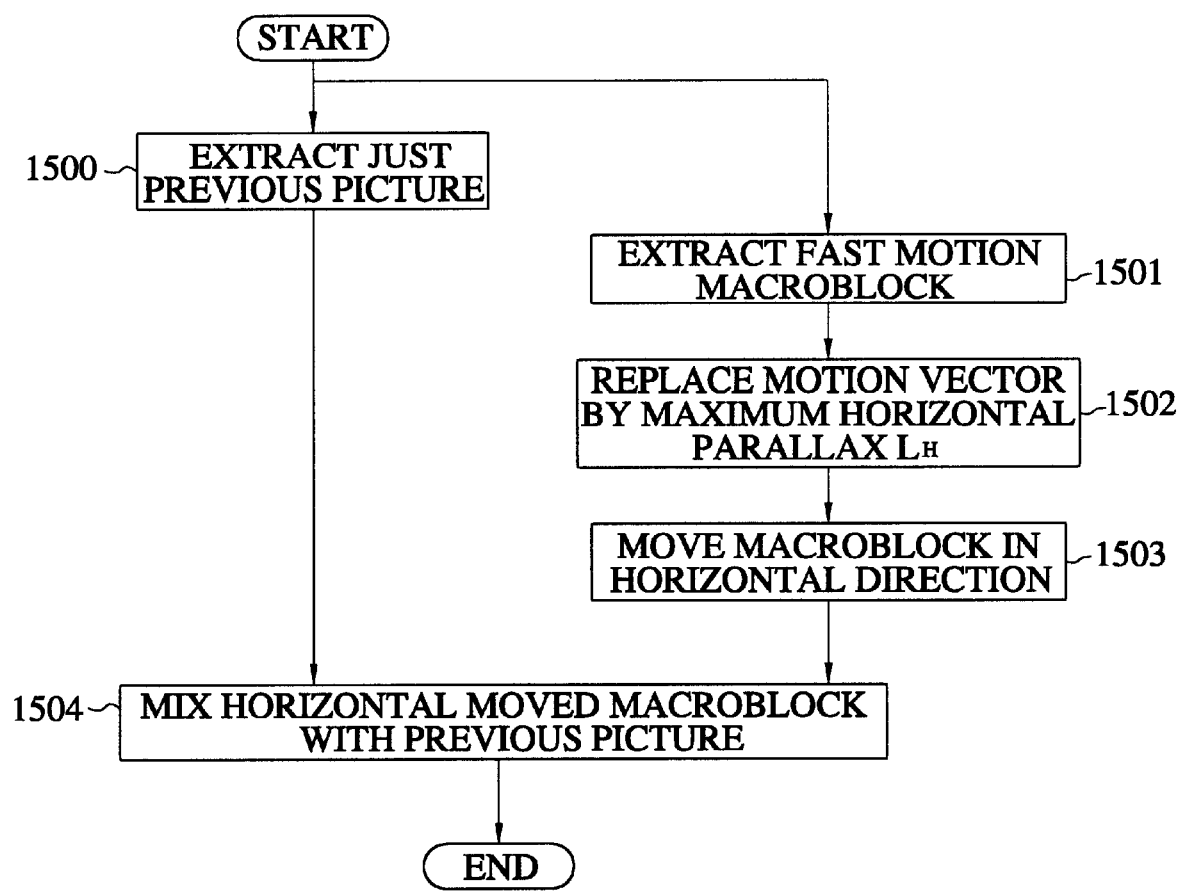
FIG. 15 is a flow-chart view for explaining a method of converting a fast motion picture into a stereoscopic image.

Referring to FIG. 15, the mixed fast motion picture generator 550 extracts a just previous picture of the current picture (step 1500). The extracted previous picture is used in step 1504. Then, the macroblocks having the motion vector components larger than the maximum horizontal parallax threshold value $L_H$ among all the macroblocks in the current picture, that is, the fast motion macroblocks are extracted (step 1501), and the motion vector component of the extracted fast motion macroblocks is replaced by $L_H$ (step 1502). Then, a corresponding macroblocks is moved by a value of $L_H$ in the horizontal direction (step 1503). The horizontally moved macroblocks and the previous picture extracted in step 1500 are mixed (step 1504), to thereby generate a mixed picture for a stereoscopic image of the fast motion picture.

Figure 16:
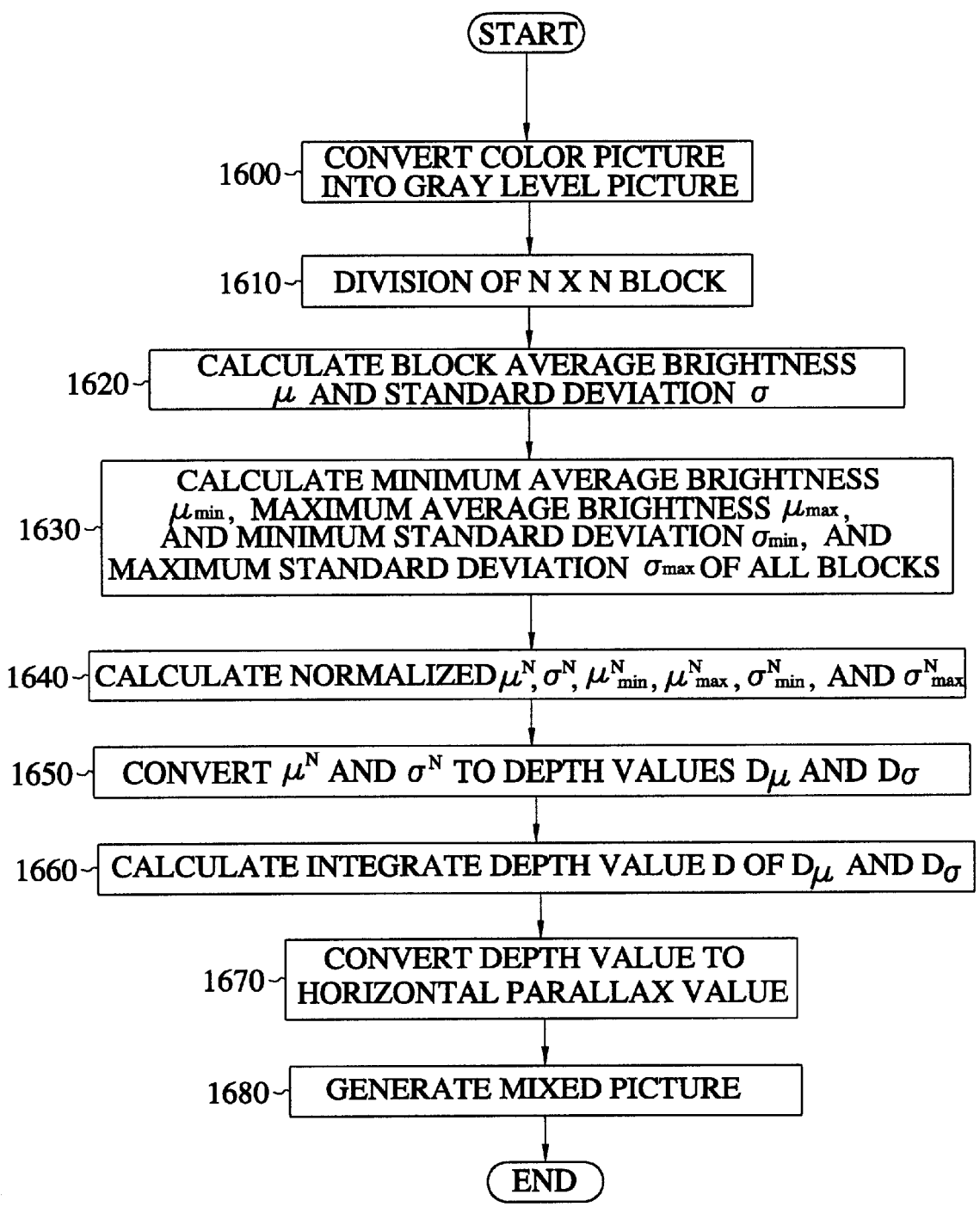
FIG. 16 is a flow-chart view for explaining a method of converting a still picture into a stereoscopic image.

The operation of the mixed still picture generator 530 shown in FIG. 5 will be described with reference to FIG. 16. If the motion type of the current picture is determined as a still picture in the motion/still motion picture determiner 500, the mixed still picture generator 530 generates a mixed image for a stereoscopic image, using the brightness and/or the standard deviation of each predetermined block in the still picture.

In more detail, the mixed still picture generator 530 firstly converts the current picture into a gray level picture (step 1600) if the still picture being the current picture is a color picture, and divides the gray level picture into N×N blocks (step 1610). Then, an average brightness μ and a standard deviation σ are calculated with respect to each block in the gray level picture (step 1620). Here, the average brightness μ with respect to each block is calculated using the following equation 23.

$$\mu = \frac{1}{N^2} \sum_i^N \sum_j^N f(i, j) \quad (23)$$

Here, N is a size of a block, and f(i, j) is a gray level value of a corresponding pixel.

Also, the standard deviation σ with respect to each block is calculated using the following equation 24.

$$\sigma = \sqrt{\frac{1}{N^2} \sum_i^N \sum_j^N [f(i, j) - \mu]^2} \quad (24)$$

If step 1620 is performed, the minimum average brightness $\mu_{min}$, the maximum average brightness $\mu_{max}$, the minimum standard deviation $\sigma_{min}$, and the maximum standard deviation $\sigma_{max}$ are obtained with respect to all blocks in the current picture (step 1630).

If steps 1620 and 1630 are completed, the normalized value is obtained with respect to each of the average brightness μ, the standard deviation σ, the minimum average brightness $\mu_{min}$, the maximum average brightness $\mu_{max}$, the minimum standard deviation $\sigma_{min}$, and the maximum standard deviation $\sigma_{max}$, using the equations 25a through 25f (step 1640).

$$\mu^N = \frac{\mu}{255} \quad (25a)$$

$$\sigma^N = \frac{\sigma}{MAX(\sigma)} \quad (25b)$$

$$\mu_{min}^N = \frac{\mu_{min}}{255} \quad (25c)$$

$$\mu_{max}^N = \frac{\mu_{max}}{255} \quad (25d)$$

$$\sigma_{min}^N = \frac{\sigma_{min}}{MAX(\sigma)} \quad (25e)$$

$$\sigma_{max}^N = \frac{\sigma_{max}}{MAX(\sigma)} \quad (25f)$$

Here, the maximum value of $\sigma_{max}^N$ is set 1.0. MAX(σ) is a standard deviation of uniform distribution when a pixel value is uniformly distributed to [0.255] which is obtained by the following equation 26.

$$MAX(\sigma) = \sqrt{\frac{255^2}{12}} = 73.0 \quad (26)$$

Then, using the equations 27a and 27b, a normalized average brightness $\mu^N$ of each block and a normalized standard deviation a $\sigma^N$ are converted into the corresponding depth values $D_\mu$ and $D_\sigma$ (step 1650).

$$D_\mu = A_1 e^{-a\mu^N} + B_1 \quad (27a)$$

$$D_\sigma = A_2 e^{-b\sigma^N} + B_2 \quad (27b)$$

Here, $A_1$, $B_1$, $A_2$ and $B_2$ are calculated using the equations 28a through equation 28d.

$$A_1 = \frac{1}{e^{-a\mu_{min}} - e^{-a\mu_{max}}} \quad (28a)$$

$$B_1 = \frac{e^{-a\mu_{max}}}{e^{-a\mu_{min}} - e^{-a\mu_{max}}} \quad (28b)$$

$$A_2 = \frac{1}{e^{-b\sigma_{min}} - e^{-b\sigma_{max}}} \quad (28c)$$

$$B_2 = \frac{e^{-b\sigma_{max}}}{e^{-b\sigma_{min}} - e^{-b\sigma_{max}}} \quad (28d)$$

If step 1650 is completed, a value D of a depth value incorporating $D_\mu$ and $D_\sigma$ calculated (step 1660), using the equation 29.

$$D = \omega \cdot D_\mu + (1-\omega) \cdot D_\sigma \quad (29)$$

Hee, D and ω have a value between 0.0 and 1.0, respectively. Accordingly, as a brightness of a corresponding block is larger in each block, a corresponding depth value is assigned with a larger value. As the brightness is darker, the corresponding depth value is assigned with a smaller value.

Then, a depth value D obtained in step 1660 is converted into the horizontal parallax value px using the following equation 30 (step 1670).

$$px = \text{max imum horizontal parallax} \cdot D \quad (30)$$

If the horizontal parallax value px is obtained in step 1670, each block is moved by the corresponding horizontal parallax value px in the horizontal direction, to thereby generate a mixed picture for a stereoscopic image of a still picture (step 1680).

The left/right picture determiner 150 of FIG. 1 receives the current picture and the mixed picture from the stereoscopic image generator 140, determines the current picture as one of the left picture and the right picture forming a stereoscopic image, and determines the mixed picture as the other thereof. In more detail, if the motion type of the received current picture is the horizontal motion picture, the mode "A" or the mode "B" is determined according to the method explained in connection with Tables 2 through 4. In the case that the motion type of the received current picture is one of the motion types which are not the horizontal motion type, it is preferable that the received current picture is determined as the left picture and the mixed picture is determined as the right picture.

The previous picture store 160 of FIG. 1 stores the previous pictures reproduced from the encoded picture data by MPEG decoder (not shown) used for generation of the mixed picture in the stereoscopic image generator 140 as described above, and stores K pictures which are earlier in time than the current picture. If a new picture is stored, the previous picture stored in the earliest in the previous picture store 160 disappears.

DACs 170 and 180 of FIG. 1 convert the left/right picture data output from the left/right picture determiner 150 into an analog image signal, to be stored in a display buffer (not shown).

In order to watch the stereoscopic image displayed on a monitor through the above-described procedure, a pair of stereoscopic glasses synchronous with the stereoscopic image are needed.

Figure 17:
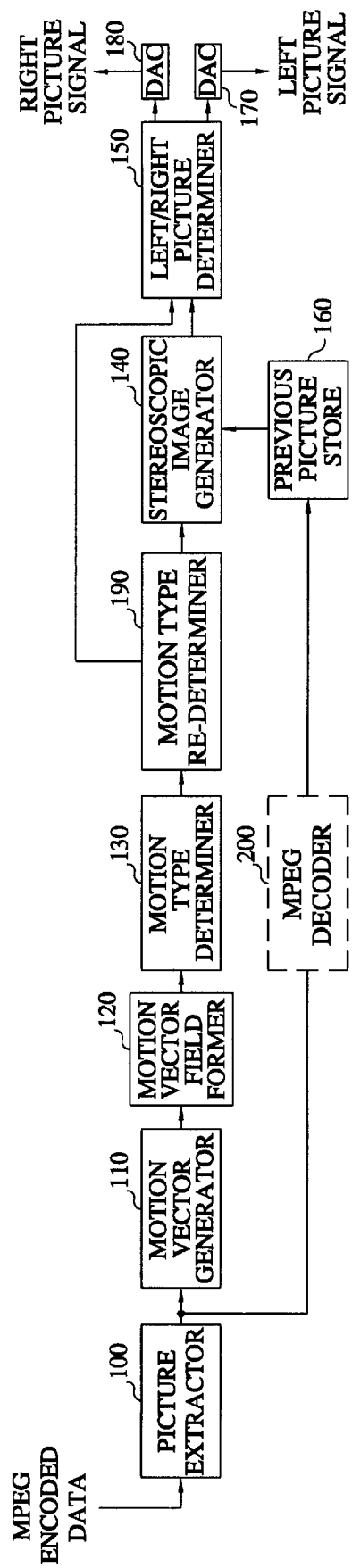
FIG. 17 is block diagram showing a stereoscopic image generation apparatus using MPEG data according to a preferred embodiment of the present invention, which is an improvement of the FIG. 1 embodiment.

Meanwhile, another embodiment of the present invention which is an improvement of the FIG. 1 embodiment is shown in FIGS. 17 through 21 The FIG. 17 embodiment remarkably reduces a picture tremble or vibration between the stereoscopic images which are successive in time, by a motion type redeterminer 190. Since the elements having the same reference numerals and symbols as those of FIG. 1 among the elements of FIG. 17 perform the same functions as those of FIG. 1, the detailed description thereof will be omitted.

The motion type redeterminer 190 shown in FIG. 17 adaptively redetermines the motion type of the current picture which has been primarily determined in the motion type determiner 130, based on the combination of the previous picture motion type and the current picture motion type. The stereoscopic image generator 140 and the left/right picture determiner 150 generates a stereoscopic image corresponding to the current picture and determines a left/right picture, based on the motion type of the current picture which has been redetermined in the motion type redeterminer 190, respectively.

Figure 18:
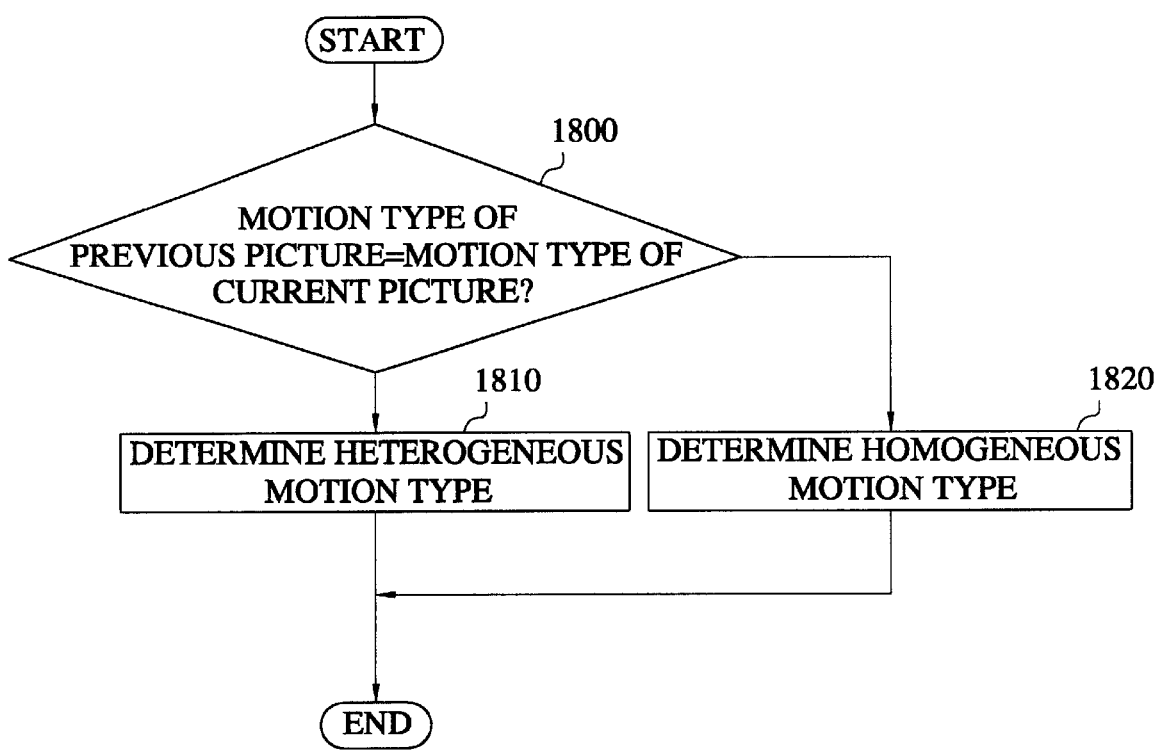
FIG. 18 is a flow-chart view for schematically explaining the operation of the motion type redeterminer shown in FIG. 17.

Referring to FIG. 18, the motion type redeterminer 190 of FIG. 17 firstly compares the motion type of the previous picture and the motion type of the current picture (step 1800). Here, it is preferable that the previous picture is an just previous picture which is successive in time with the current picture. Here, the motion types of the picture under consideration are classified into a still picture, a non-horizontal motion picture, and a horizontal motion picture, in which the horizontal motion picture covers a fast horizontal motion picture and a horizontal motion picture considerd in the motion type determiner 130.

In the comparison result of step 1800, if the motion types of two pictures differ from each other, the motion type redeterminer 190 redetermines the motion type of the current picture according to a heterogeneous motion type decision algorithm (step 1810). If the motion types of two pictures equal, the motion type redeterminer 190 redetermines the motion type of the current picture according to a homogeneous motion type decision algorithm (step 1820).

In connection with step 1810, the method for adaptively redetermining the motion type of the current picture in the case that the motion types of the previous picture and the current picture differ from each other will be described in detail with reference to FIGS. 19 and 20. As described above, there are three kinds such as a still picture, a non-horizontal motion picture and a horizontal motion picture as a motion type of the picture considered in the motion type redeterminer 190. Therefore, in the case that the motion type of the previous picture is a still picture, the motion type of the current picture becomes a non-horizontal motion picture or a horizontal motion picture. In this case, the motion type of the current picture is not corrected. In two other cases, the threshold values used for each motion type determination of the current picture in the motion type determiner 130 are adaptively redetermined according to each combination of the motion types of the previous picture and the current picture, to thereby redetermine the motion type of the current picture. Accordingly, in the case that a correlation between the previous picture and the current picture is considerably large, the motion type of the current picture is corrected into the motion type of the previous picture. As a result, a tremble between the stereoscopic images which are successive in time when watching the stereoscopic images is reduced remarkably.

Then, in the case that the motion type of the previous picture is a non-horizontal motion picture, the motion type of the current picture becomes a still picture or a horizontal motion picture. The motion type of the current picture is adaptively redetermined according to the algorithm shown in FIG. 19.

Figure 19:
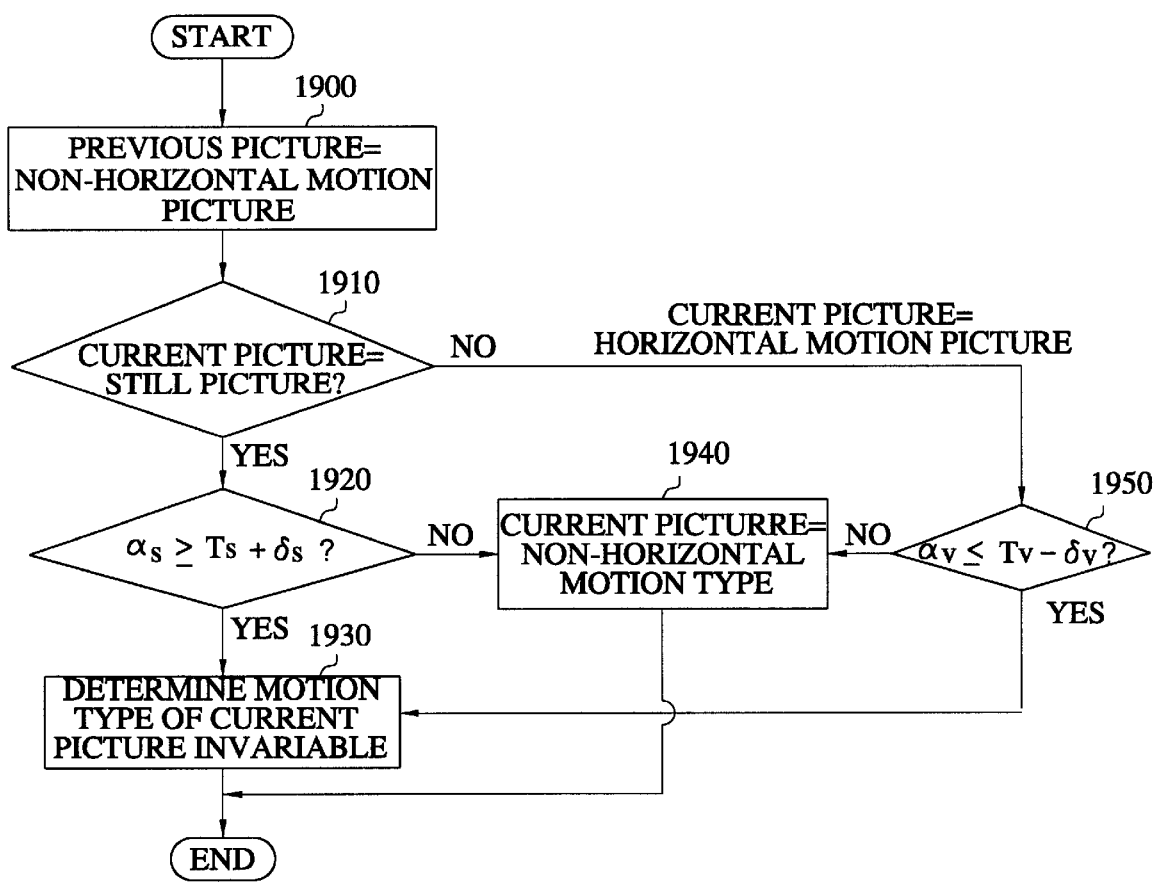
FIG. 19 is a flow-chart view for explaining redetermination of the motion type of the current picture, in the case that the motion type of the previous picture is a non-horizontal motion picture.

Referring to FIG. 19, if the motion type of the previous picture is primarily determined as a non-horizontal motion picture (step 1900), and the motion type of the current picture is primarily determined as a still picture in the motion/still picture determiner 500 (step 1910), the motion type redeterminer 190 compares the magnitude of a ratio $\alpha_S$ of the current picture according to the equation 7 with a newly adjusted threshold value "$T_S + \delta_S$" (step 1920). Here, it is determined as a value of $\delta_S = [0, 1-T_S]$. Therefore, the newly adjusted threshold value ($T_S + \delta_S$) is properly adjusted upward in comparison with the threshold value $T_S$ at the time of the primary determination. In the comparison result of step 1920, if the magnitude of $\alpha_S$ obtained from the current picture is not less than the upward adjusted threshold value $T_S + \delta_S$, the motion type of the current picture is determined as invariable (still picture) (step 1930). If the former is less than the latter, the motion type of the current picture is redetermined as a non-horizontal motion picture being the motion type of the previous picture (step 1940).

Meanwhile, in steps 1900 and 1910, if it is primarily determined that the motion type of the previous picture is a non-horizontal motion picture and the motion type of the current picture is a horizontal motion picture, the motion type redeterminer 190 compares the magnitude of the ratio $\alpha_V$ of the current picture according to the equation 9 with the newly adjusted threshold value $T_V\delta_V$ (step 1950). Here, $\delta_V=[0,T_V]$. Thus, the newly adjusted threshold value $T_V-\delta_V$ is properly adjusted downwards than the threshold value $T_V$ of the primary determination. In the comparison result of step 1950, if the magnitude of $\alpha_V$ corresponding to the current picture is not greater than the downward adjusted threshold value $T_V-\delta_V$, the motion type of the current picture is determined as invariable, that is, a horizontal motion picture (sep 1930). If the former is greater than the latter, the motion type of the current picture is redetermined as a non-horizontal motion picture which is the motion type of the previous picture (step 1940).

Therefore, in step 1940, in the cases that the motion type of the current picture is redetermined as a non-horizontal motion picture, the motion vector field of the current picture is replaced by the motion vector field of the previous picture, and the motion kind of the camera and/or the object in the current picture is replaced by those of the previous picture. Accordingly, a stereoscopic image corresponding to the non-horizontal motion picture is generated in the stereoscopic image generator 140.

Meanwhile, in the case that the motion type of the previous picture is a horizontal motion picture, the motion type of the current picture becomes a still picture or a non-horizontal motion picture primarily. The motion type of the current picture is adaptively redetermined according to the algorithm shown in FIG. 20.

Figure 20:
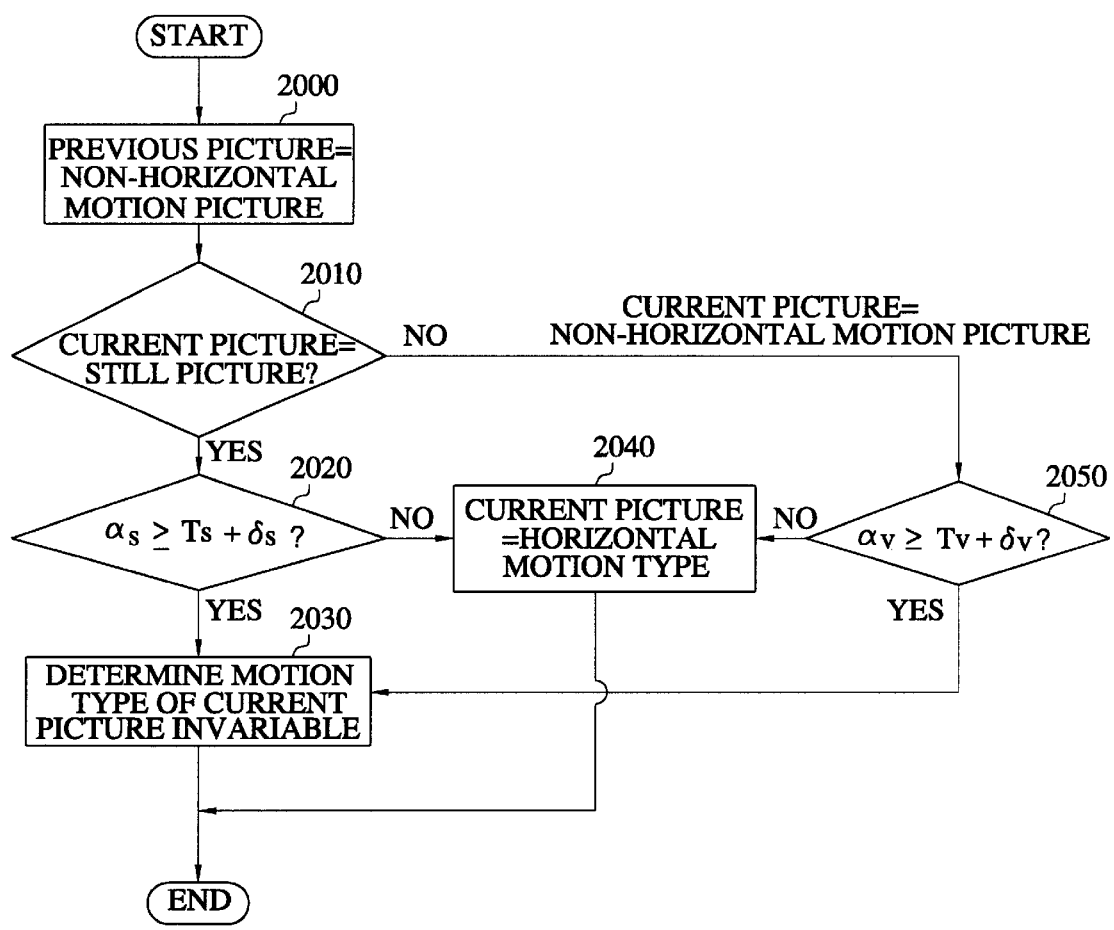
FIG. 20 is a flow-chart view for explaining redetermination of the motion type of the current picture, in the case that the motion type of the previous picture is a horizontal motion picture.

Referring to FIG. 20, if it is determined that the motion type of the previous picture is primarily determined as a horizontal motion picture (step 2000) and the motion type of the current picture is primarily determined as a still picture in the motion/still picture determiner 500 (step 2010), the motion type redeterminer 190 compares the magnitude of the ratio αs of the current picture according to the equation 7 with the newly adjusted threshold value Ts+δs (step 2020). Here, δs=[0,1−Ts]. Thus, the newly adjusted threshold value Ts+δs is properly adjusted upwards than the threshold value Ts of the primary determination. In the comparison result of step 2020, if the magnitude of αs corresponding to the current picture is not smaller than the upward adjusted threshold value Ts+δs, the motion type of the current picture is determined as invariable, that is, a still motion picture (sep 2030). If the former is smaller than the latter, the motion type of the current picture is redetermined as a horizontal motion picture which is the motion type of the previous picture (step 2040).

Meanwhile, in steps 2000 and 2010, if it is determined primarily that the motion type of the previous picture is a horizontal motion picture and the motion type of the current picture is a non-horizontal motion picture, the motion type redeterminer 190 compares the magnitude of the ratio $\alpha_V$ of the current picture according to the equation 9 with the newly adjusted threshold value $T_V+\delta_V$ (step 2050). Here, $\delta_V=[0,T_V]$. Thus, the newly adjusted threshold value $T_V+\delta_V$ is properly adjusted upwards than the threshold value $T_V$ of the primary determination. In the comparison result of step 2050, if the magnitude of $\alpha_V$ corresponding to the current picture is not smaller than the upward adjusted threshold value $T_V+\delta_V$, the motion type of the current picture is determined as invariable, that is, a non-horizontal motion picture (sep 2030). If the former is smaller than the latter, the motion type of the current picture is redetermined as a horizontal motion picture which is the motion type of the previous picture (step 2040).

Therefore, in step 2040, in the cases that the motion type of the current picture is redetermined as a horizontal motion picture, the delay factor $f_d$ of the current picture is replaced by the delay factor $f_d$ of the previous picture, and the mode "A" or "B" of the current picture is replaced by that of the previous picture. Accordingly, the previous picture corresponding to the replaced delay factor $f_d$ is selected in the stereoscopic image generator 140 and a display of the stereoscopic image is determined in the left/right picture determiner according to the replaced mode.

Figure 21:
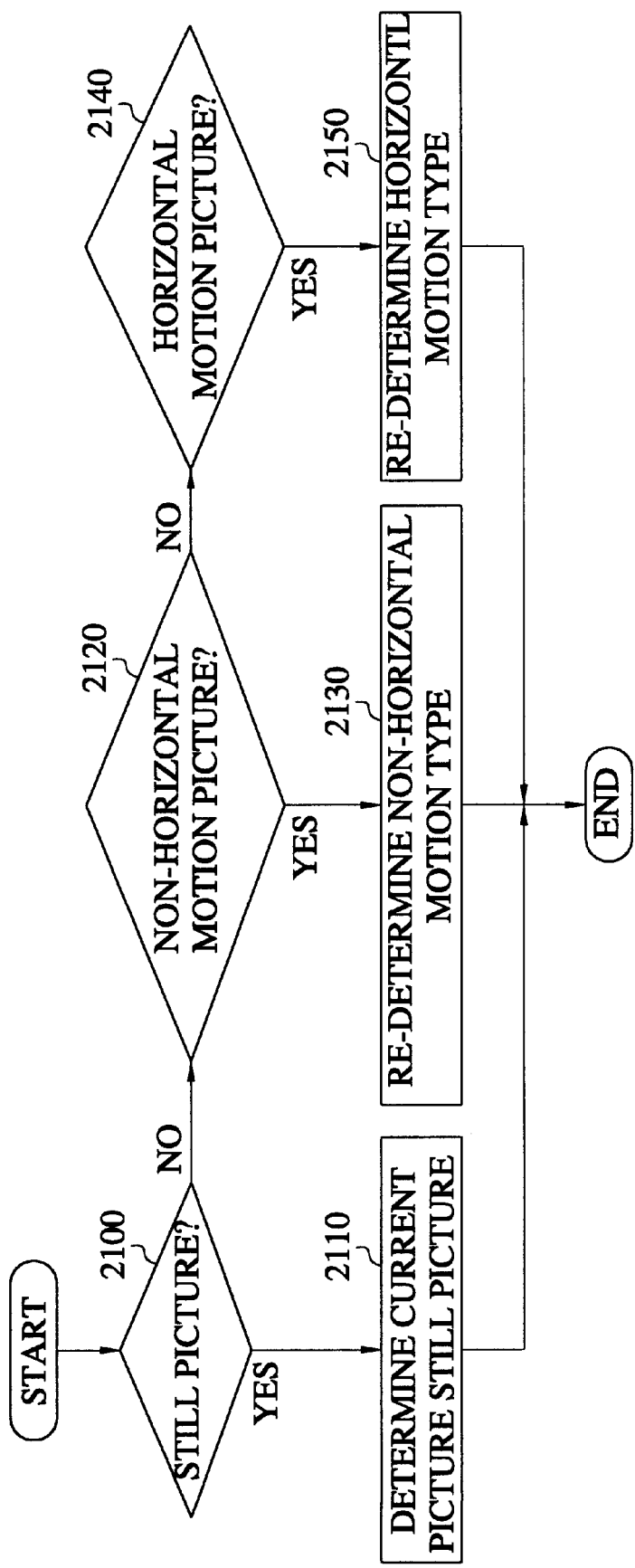
FIG. 21 is a flow-chart view for explaining redetermination of the motion type of the current picture, in the case that the motion type of the previous picture is same as that of the current picture.

FIG. 21 schematically shows a method for redetermining the motion type of the current picture in the case that the motion types of the previous picture and the current picture are same with each other. Referring to FIG. 21, if both the motion types of the previous and current pictures are still pictures (step 2100), the motion type of the current picture is invariable, that is a still picture (step 2110).

Then, if both primary the motion types of the previous and current pictures are non-horizontal motion pictures (step 2120), the motion type redeterminer 190 redetermines the motion kind of the camera and/or the object in the non-horizontal motion picture being the current picture (step 2130). In the non-horizontal motion picture, there are three motion kinds such as the cases that both the camera and the object move, only the object moves, and only the camera moves. The method for redetermining the motion kinds of the camera and/or the object in the non-horizontal motion picture will be described with reference to the PDA and SDA shown in FIG. 12. In the PDA, it is calculated that a value according to the following equation 31

$$\gamma_{PDA} = \frac{MAX(PDA[m], PDA[n])}{PDA[l]} \quad (31)$$

Here, m≠n≠l. Among PDA[0], PDA[1] and PDA[2], the largest number is determined as the PDA[l]. The larger number of the remaining two numbers PDA[m] and PDA[n] is taken to calculate the equation 31. Then, if a value of the ratio γ PDA calculated according to the equation 31 is smaller than the threshold value $T_{PDA}$, the above-described value of l is replaced by the value of l of the previous picture. Here, $T_{PDA}=[0.0, 1.0]$.

As in the PDA, the SDA calculates a value according to the following equation 32.

$$\gamma_{SDA} = \frac{MAX(SDA[q], SDA[r])}{SDA[p]} \quad (32)$$

Here, q≠r≠p. Among SDA[0], SDA[1] and SDA[2], the largest number is determined as the SDA[p]. The larger number of the remaining two numbers SDA[q] and SDA[r] is taken to calculate the equation 32. Then, if a value of the ratio $\gamma s_{DA}$ calculated according to the equation 32 is smaller than the threshold value $Ts_{DA}$, the above-described value of p is replaced by the value of p of the previous picture. Here, $Ts_{DA}=[0.0, 1.0]$.

Using the values of the l and p obtained by the above-described methods, the motion type redeterminer 190 redetermines the motion kinds of the camera and/or the object in the non-horizontal motion picture being the current picture. The redetermined motion kinds are used for generation of the stereoscopic image corresponding to the non-horizontal motion picture being the current picture in the stereoscopic image generator 140.

In the flow-chart view of FIG. 21, if the both motion types of the previous picture and the current picture are horizontal motion picture (step 2140) primarily, the motion type redeterminer 190 redetermines a delay factor or a mode "A" or "B" which are used for the generation and display mode decision of the stereoscopic image corresponding to the horizontal motion picture.

First, in order to redetermine the motion kinds of the camera and/or the object in the horizontal motion picture being the current picture, the values of l and p as in step 2130 are obtained. The obtained values of l and p are applied to Tables 2 through 4, to determine a mode "A" or "B." The mode determined is used for a display of the stereoscopic image corresponding to the horizontal motion picture in the left/right picture determiner 150.

Meanwhile, in order to suppress an abrupt change of the delay factor between the previous picture and the current picture, the equation 33 or 34 is used to obtain the delay factor $f_d$ to be used for generating the stereoscopic image of the current picture being the horizontal motion picture, taking both the delay factors of the previous picture and the current picture into consideration.

$$f_d = \omega \cdot \text{ROUND}\left[\frac{L_H}{dx_{\max}(k-1)}\right] + \quad (33)$$

$$(1-\omega) \cdot \text{ROUND}\left[\frac{L_H}{dx_{\max}(k)}\right]$$

$$f_d = \text{ROUND}\left[\frac{L_H}{\omega \cdot dx_{\max}(k-1) + (1-\omega) \cdot dx_{\max}(k)}\right] \quad (34)$$

In the equations 33 and 34, the maximum horizontal parallax threshold value $L_H$ is obtained using the equation 11. The term $dx_{max}(k)$ is the maximum horizontal motion velocity of the current picture, the term $dx_{max}(k-1)$ is the maximum horizontal motion velocity of the previous picture. The weight values $\omega$ and $(1-\omega)$ are determined properly.

Therefore, the motion type of the current picture is adaptively redetermined by the motion type redeterminer 190 according to the combination of each motion type of the previous picture and the current picture, and a trembling of the stereoscopic images which are successive temporally is remarkably reduced by the generation of the stereoscopic image and the left/right picture determination based on the redetermined result.

Meanwhile, the MPEG decoder 200 shown in a dashed line in FIG. 1 reproduces the encoded bitstream into a prior-to-being-compressed original image and supplies the result to the previous picture store 160. Since the detailed configuration and operation of the MPEG decoder is obvious to one having an ordinary skill in the art, the detailed description thereof will be omitted.

Also, the embodiments of the FIGS. 1 and 17 according to the present invention are applied to the MPEG-standard encoded image data. However, it is obvious to a person who has an ordinary skill in the art that the present invention can be applied to the image data encoded in the encoding methods different from the MPEG-standard.

It is also obvious to one skilled in the art that the method and apparatus for generating the stereoscopic image which is adaptively stable with respect to the various motion types of the pictures, proposed in the present invention can be applied to the analog image signals of the NTSC/PAL/SECAM as well as the MPEG encoded data.

As described above, the stereoscopic image generation method and apparatus according to the present invention determines the motion type of the picture into one of a still picture, a non-horizontal motion picture, a horizontal motion picture and a fast motion picture, and generates the optimal stereoscopic image in each motion type of the determined picture, to thereby enable the natural and stable stereoscopic image to be viewed even in the various motion types. Also, the present invention can generate the stereoscopic image efficiently from the MPEG encoded data, to thereby simplify complexity of algorithm and the hardware for generation of the stereoscopic image remarkably.

The present invention can be adopted in the MPEG-2 HDTV, MPEG-2 DVD Player, MPEG-1 Video CD employing the MPEG standards, and TV and VCR for image signals according to the NTSC/PAL/SECAM broadcasting methods which do not adopt the MPEG standards. The present invention can be also adapted to a medical visualization system for improving a diagnostic efficiency highly.

Meanwhile, it is obvious to one skilled in the art who understands the technological concept and the preferred embodiments well that a variety of modifications or variations which are not mentioned in the technological scope of the present invention may possibly exist.

What is claimed is:

1. A stereoscopic image generation method for generating a stereoscopic image from image data, the method comprising the steps of:
   (a) determining a motion type of a current picture into one of a still picture, a non-horizontal motion picture, a horizontal motion picture and a fast motion picture, using motion vectors in each picture according to the image data;
   (b) generating a mixed picture corresponding to the current picture using previous pictures according to the image data and the determined motion type and outputting the current picture and the mixed picture; and
   (c) receiving the output current picture and mixed picture and determining the current picture into one of the left picture and the right picture forming a stereoscopic image and the mixed picture into the other thereof, in accordance with the motion type determined in step (a).

2. The stereoscopic image generation method of claim 1, wherein said step (a) comprises the step of determining the motion type of the current picture based on a ratio occupied by the macroblocks having a motion feature corresponding to said each motion type among the entire macroblocks of the current picture.

3. The stereoscopic image generation method of claim 1, wherein said step (b) uses at least one of:
   a first method of allocating depth information differently from each other based on a brightness of predetermined each block in the current picture and/or the standard deviation thereof, converting the allocated depth information into a horizontal parallax, and generating the mixed picture, if the motion type of the current picture is determined as a still picture in step (a);
   a second method of generating the mixed picture adaptively to the motion kind of a camera and/or an object in the current picture if the motion type of the current picture is determined as a non-horizontal motion picture in step (a);
   a third method of replacing the motion vectors of the fast macroblocks in the current picture by the maximum horizontal parallax value and generating the mixed picture, if the motion type of the current picture is determined as a fast motion picture in step (a); and a fourth method of generating the previous picture as the mixed picture, based on the maximum horizontal parallax threshold value and a predetermined horizontal motion velocity of the motion vectors in the current picture, if the motion type of the current picture is determined as a horizontal motion picture in step (a).

4. The stereoscopic image generation method of claim 1, wherein said step (c) comprises the steps of:
   selecting a first mode in the case of the motion types where the motion type of the determined current picture is not a horizontal motion picture; and
   adaptively selecting one of the first mode and a second mode according to the motion kind of a camera and/or an object in the horizontal motion current, in the case that the motion type of the determined current picture is the horizontal motion picture,
   in which the first mode is a stereoscopic image display mode where the current picture is determined as a left picture and the corresponding mixed picture is determined as a right picture, and the second mode is a stereoscopic image display mode where the current picture is determined as a right picture and the corresponding mixed picture is determined as a left picture.

5. The stereoscopic image generation method of claim 1, wherein said step (a) further comprises the step of adaptively redetermining the motion type of the determined current picture, based on combination of each motion type of the current picture and the previous picture, in order to reduce the picture trembling between the temporally successive stereoscopic images remarkably.

6. A stereoscopic image generation method for generating a stereoscopic image using MPEG encoded data containing I, B and P pictures, the method comprising the steps of:
   (a) receiving the picture data and generating and storing motion vectors corresponding to macroblocks in the picture;
   (b) storing the pictures rerproducted from the encoded picture data by the number K of pictures;
   (c) determining a motion type corresponding to a current picture using the motion vectors stored in step (a);
   (d) generating a mixed picture corresponding to the current picture using the previous pictures stored in step (b) and the motion type determined in step (c) and outputting the current picture and the mixed picture; and
   (e) receiving the current picture and the mixed picture output from step (d) and determining the current picture into one of the left picture and the right picture forming a stereoscopic image and the mixed picture into the other thereof.

7. The stereoscopic image generation method of claim 6, wherein said step (a) comprises the steps of parsing the bitstream containing the picture data, extracting data of the I, B and P pictures, and extracting and generating the motion vector of the macroblock of each picture using the extracted I, B and P pictures, thereby forming the motion vector field of the corresponding picture.

8. The stereoscopic image generation method of claim 7, wherein said step (a) comprises the steps of extracting the motion vector contained in the picture data for each macroblock, scaling the extracted result considering picture interval M applied at the time of predictive encoding, applying an interpolation method to a macroblock having no motion vector to obtain the motion vector of a corresponding macroblock, and forming a motion vector field of a B picture with the scaled motion vector and the interpolated motion vector, in the case that the extracted picture data is the B picture data.

9. The stereoscopic image generation method of claim 7, wherein said step (a) comprises the steps of extracting the motion vector contained in the picture data for each macroblock, scaling the extracted result considering a picture interval M between an I/P picture and a P picture applied at the time of predictive encoding, applying an interpolation method to a macroblock having no motion vector to obtain the motion vector of a corresponding macroblock, and forming a motion vector field of the P picture with the scaled motion vector and the interpolated motion vector, in the case that the extracted picture data is the P picture data.

10. The stereoscopic image generation method of claim 7, wherein said step (a) comprises the step of forming the motion vector of the I picture using at least one motion vectors of the B picture which has been backward predicted prior to the I picture, in the case that the extracted picture data is the I picture data.

11. The stereoscopic image generation method of claim 10, wherein the motion vector of the I picture is obtained by using the motion vectors of the macroblocks in the B picture corresponding to each macroblock in the I picture, and the motion vector of the I picture is obtained by using one of a first method considering the motion vectors of the macroblocks corresponding to the B picture and the whole directions of the motion vectors, a second method considering only the motion vectors of the corresponding macroblocks, and a third method considering only an area of the corresponding macroblocks.

12. The stereoscopic image generation method of claim 6, wherein said step (c) comprises the step of determining the motion type of the current picture into one of a still picture, a non-horizontal motion picture, a horizontal motion picture and a fast motion picture, using the motion vectors obtained in step (a).

13. The stereoscopic image generation method of claim 12, wherein said step (c) comprises the step of determining the motion type of the current picture based on a ratio occupied by the macroblocks having the motion feature corresponding motion type among the whole macroblocks in the current picture.

14. The stereoscopic image generation method of claim 13, wherein said step (c) comprises the steps of determining the motion type of the current picture into one of a still picture and a motion picture, based on a ratio occupied by the still macroblocks among the whole macroblocks of the current picture,
   determining the motion type of the current picture into one of a non-horizontal motion picture and a horizontal motion picture, based on a ratio occupied by the non-horizontal macroblocks based on the maximum vertical fusion threshold angle and the maximum vertical parallax threshold value among the whole macroblocks of the current picture, and
   determining the motion type of the current picture into one of a fast motion picture and a horizontal motion picture, based on a ratio occupied by the fast motion macroblocks based on the maximum horizontal parallax threshold value among the whole macroblocks of the current picture.

15. The stereoscopic image generation method of claim 12, wherein said step (d) comprises the steps of allocating depth information differently from each other based on a brightness of predetermined each block in the current picture and/or the standard deviation thereof, converting the allocated depth information into a horizontal parallax, and generating the mixed picture, if the motion type of the current picture is determined as a still picture in step (c).

16. The stereoscopic image generation method of claim 12, wherein if the motion type of the current picture is determined as a non-horizontal motion picture in step (c), said step (d) comprises the steps of allocating a parallax value differently from each other between the macroblocks whose motion directions are same as the camera motion direction and the macroblocks whose motion directions are not same as the camera motion direction, in the case that both the camera and the object move in the current picture and generating the mixed picture, said step (d) comprises the steps of allocating a parallax value differently from each other between the motion macroblocks and the still macroblocks, in the case that only the object moves in the current picture and generating the mixed picture, and said step (d) comprises the steps of obtaining a parallax value corresponding to a current macroblock using at least one motion vector of peripheral edge macroblock according to the edge feature of the current macroblock and the motion vector of the previous picture macroblock, in the case that only the camera moves in the current picture and generating the mixed picture.

17. The stereoscopic image generation method of claim 12, wherein said step (d) comprises the steps of converting the motion vector of the fast motion macroblocks in the current picture into the maximum horizontal parallax value, so that the macroblocks is moved by the maximum horizontal parallax value, mixing the horizontally moved macroblocks with the just previous picture to thereby generate the mixed picture, if the motion type of the current picture is determined as a fast motion picture in step (c).

18. The stereoscopic image generation method of claim 12, wherein said step (d) comprises the steps of generating the previous picture as mixed picture based on the maximum horizontal parallax threshold value, the average horizontal motion velocity or the maximum horizontal motion velocity of the motion vectors in the current picture, if the motion type of the current picture is determined as a horizontal motion picture in step (c), and wherein if the horizontal motion velocity in the current picture is relatively fast, a temporally close previous picture is selected, while if the horizontal motion velocity in the current picture is relatively slow, a temporally far previous picture is selected.

19. The stereoscopic image generation method of claim 12, wherein said step (e) comprises the steps of:

selecting the first mode in the case that the motion type of the current picture is determined as the motion types which are not the horizontal motion picture in said step (c); and adaptively selecting one of the first mode and the second mode according to the motion kind of the camera and/or the object in the current picture in the case that the motion type of the current picture is determined as the horizontal motion picture in said step (c), in which the first mode is a stereoscopic image display mode where the current picture is determined as a left picture and the corresponding mixed picture is determined as a right picture, and the second mode is a stereoscopic image display mode where the current picture is determined as a right picture and the corresponding mixed picture is determined as a left picture.

20. The stereoscopic image generation method of claim 19, wherein if the motion type of the current picture is a horizontal motion picture, the motion vector field of the current picture is analyzed, so as to select the first mode in the cases that only the camera moves to the left, only the object moves to the right, both the camera and the object move to the right, or the camera moves to the left and the object moves to the right, in the current picture and to select the second mode in the cases that only the camera moves to the right, only the object moves to the left, the camera moves to the right and the object moves to the left, both the camera and the object move to the left, the camera moves to the right and the objects move to the left and right, or the camera moves to the left and the objects move to the left and right, in the current picture.

21. The stereoscopic image generation method of claim 19, wherein if the motion type of the current picture is a horizontal motion picture, the current picture is bisected into a first area being an edge area and a second area being a central area, and the motion kind of the camera and/or the object in the current picture is determined based on the each horizontal motion vector directions and the macroblocks belonging to each of the first area and the second area, and the number and the distribution thereof.

22. The stereoscopic image generation method of claim 12, further comprising the step of adaptively redetermining the motion type of the determined current picture, based on the combination of each motion type of the current picture and the previous picture, in order to remarkably reduce the picture trembling between the temporally successive stereoscopic images.

23. The stereoscopic image generation method of claim 22, wherein the motion types of the picture considered in the motion type redetermination step are classified into a still picture, a non-horizontal motion picture and a horizontal motion picture, in which the horizontal motion picture comprises a fast motion picture and a horizontal motion picture which are considered in the initial determination, and if the motion type of the previous picture is a still picture, the motion type which has been determined initially does not change irrespective of the motion type of the current picture.

24. The stereoscopic image generation method of claim 23, wherein said motion type redetermination step comprises the steps of adaptively readjusting the threshold values used at the time of the initial determination of the motion type of the current picture according to the combination of each motion type of the current picture and the previous picture, and redetermining the motion type of the current picture, if the motion types of the previous picture and the current picture are different from each other.

25. The stereoscopic image generation method of claim 23, wherein if the motion types of the previous picture and the current picture are same, said motion type redetermination step comprises the steps of redetermining the motion kind of the camera and/or the object in the non-horizontal motion picture and generating the corresponding stereoscopic image based on the redetermined result, in the case that both the motion types of the previous picture and the current picture are non-horizontal motion pictures, and said motion type redetermination step comprises the steps of determining the previous picture corresponding to the mixed picture considering the horizontal motion velocities of both the previous and current pictures, redetermining the motion kind of the camera and/or the object in the current picture and determining a stereoscopic image display mode based on the redetermined result, in the case that both the motion types of the previous picture and the current picture are horizontal motion pictures.

26. A stereoscopic image generation apparatus for generating a stereoscopic image from image data, the apparatus comprising:

a motion type determiner for determining a motion type of a current picture into one of a still picture, a non-horizontal motion picture, a horizontal motion picture and a fast motion picture, using motion vectors in each picture according to the image data;

a stereoscopic image generator for generating a mixed picture corresponding to the current picture using previous pictures according to the image data and the determined motion type and outputting the current picture and the mixed picture; and a left/right picture determiner for receiving the current picture and mixed picture output from the stereoscopic image generator and determining the current picture into one of the left picture and the right picture forming a stereoscopic image and the mixed picture into the other thereof, in accordance with the motion type determined in the motion type determiner.

27. The stereoscopic image generation apparatus of claim 26, wherein said motion type determiner determines the motion type of the current picture based on a ratio occupied by the macroblocks having a motion feature corresponding to said each motion type among the entire macroblocks of the current picture.

28. The stereoscopic image generation apparatus of claim 26, wherein said stereoscopic image generator comprises at least one of a mixed still picture generator, a mixed non-horizontal motion picture generator, a mixed fast motion picture generator, and a mixed horizontal motion picture generator, if the motion type of the current picture is determined as a still picture in said motion type determiner, said mixed still picture generator allocating depth information differently from each other based on a brightness of predetermined each block in the current picture and/or the standard deviation thereof, converting the allocated depth information into a horizontal parallax, and generating the mixed picture, if the motion type of the current picture is determined as a non-horizontal motion picture in said motion type determiner, said mixed non-horizontal motion picture generator allocating a parallax value differently from each other between the macroblocks whose motion directions are same as the camera motion direction and the macroblocks whose motion directions are not same as the camera motion direction, in the case that both the camera and the object move in the current picture and generating the mixed picture, allocating a parallax value differently from each other between the motion macroblocks and the still macroblocks, in the case that only the object moves in the current picture and generating the mixed picture, and obtaining a parallax value corresponding to a current macroblock using at least one motion vector of peripheral edge macroblock according to the edge feature of the current macroblock and the motion vector of the previous picture macroblock, in the case that only the camera moves in the current picture and generating the mixed picture.

if the motion type of the current picture is determined as a fast motion picture in said motion type determiner, said mixed fast motion picture generator converting the motion vector of the fast motion macroblocks in the current picture into the maximum horizontal parallax value, so that the macroblocks is moved by the maximum horizontal parallax value, mixing the horizontally moved macroblocks with the just previous picture to thereby generate the mixed picture, and if the motion type of the current picture is determined as a horizontal motion picture in said motion type determiner, said mixed horizontal motion picture generator generating the previous picture based on the maximum horizontal parallax threshold value and the predetermined horizontal motion value of the motion vectors in the current picture, as mixed picture.

29. The stereoscopic image generation apparatus of claim 26, wherein said left/right picture determiner comprises the steps of:

selecting the first mode in the case that the motion type of the current picture is determined as the motion types which are not the horizontal motion picture in said motion type determiner; and adaptively selecting one of the first mode and the second mode according to the motion kind of the camera and/or the object in the current picture in the case that the motion type of the current picture is determined as the horizontal motion picture in said motion type determiner, in which the first mode is a stereoscopic image display mode where the current picture is determined as a left picture and the corresponding mixed picture is determined as a right picture, and the second mode is a stereoscopic image display mode where the current picture is determined as a right picture and the corresponding mixed picture is determined as a left picture.

30. The stereoscopic image generation apparatus of claim 26, further comprising a motion type redeterminer for adaptively redetermining the motion type of the current picture determined in said motion type determiner, based on the combination of each motion type of the current picture and the previous picture, in order to remarkably reduce the picture trembling between the temporally successive stereoscopic images, in which the redetermined motion type of the current picture is used for generation of the corresponding stereoscopic image and/or determination of the left/right picture.

31. The stereoscopic image generation apparatus of claim 26, wherein said stereoscopic image generator comprises at least one of a mixed still picture generator, a mixed non-horizontal motion picture generator, a mixed fast motion picture generator, and a mixed horizontal motion picture generator, if the motion type of the current picture is determined as a still picture in said motion type determiner, said mixed still picture generator allocating depth information differently from each other based on a brightness of predetermined each block in the current picture and/or the standard deviation thereof, converting the allocated depth information into a horizontal parallax, and generating the mixed picture corresponding to the still picture, if the motion type of the current picture is determined as a non-horizontal motion picture in said motion type determiner, said mixed non-horizontal motion picture generator allocating a parallax value differently from each other between the macroblocks whose motion directions are same as the camera motion direction and the macroblocks whose motion directions are not same as the camera motion direction, in the case that both the camera and the object move in the current picture and generating the mixed picture, allocating a parallax value differently from each other between the motion macroblocks and the still macroblocks, in the case that only the object moves in the current picture and generating the mixed picture, and obtaining a parallax value corresponding to a current macroblock using at least one motion vector of peripheral edge macroblock according to the edge feature of the current macroblock and the motion vector of the previous picture macroblock, in the case that only the camera moves in the current picture and generating the mixed picture corresponding to the non-horizontal motion picture, if the motion type of the current picture is determined as a fast motion picture in said motion type determiner, said mixed fast motion picture generator converting the motion vector of the fast motion macroblocks in the current picture into the maximum horizontal parallax value, so that the macroblocks is moved by the maximum horizontal parallax value, mixing the horizontally moved macroblocks with the just previous picture to thereby generate the mixed picture corresponding to the fast motion picture, and if the motion type of the current picture is determined as a horizontal motion picture in said motion type determiner, said mixed horizontal motion picture generator generating the previous picture based on the maximum horizontal parallax threshold value and the predetermined horizontal motion value of the motion vectors in the current picture, as mixed picture corresponding to the horizontal motion picture.

32. A stereoscopic image generation apparatus for generating a stereoscopic image using MPEG encoded data containing I, B and P pictures, the apparatus comprising:

a motion vector generation and storing unit for receiving the encoded picture data and generating and storing motion vectors corresponding to macroblocks in the picture;

a picture storing unit for storing pictures reproducted from the encoded picture data by the number K of pictures;

a motion type determiner for determining a motion type corresponding to a current picture using the motion vectors stored in the motion vector generation and storing unit;

a stereoscopic image generator for generating a mixed picture corresponding to the current picture using the previous pictures stored in the picture storing unit and the motion type determined in the motion type determiner and outputting the current picture and the mixed picture; and a left/right picture determiner for receiving the current picture and the mixed picture output from the stereoscopic image generator and determining the current picture into one of the left picture and the right picture forming a stereoscopic image and the mixed picture into the other thereof.

33. The stereoscopic image generation apparatus of claim 32, wherein said motion vector generation and storing unit comprises:

a picture extractor for extracting data of the I, B and P pictures from the MPEG encoded data;

a B picture motion vector generator for extracting and generating each macroblock motion vector of the B picture from the B picture encoded data in said picture extractor;

a P picture motion vector generator for extracting and generating each macroblock motion vector of the P picture from the P picture encoded data in said picture extractor;

an I picture motion vector generator for generating the I picture motion vector using the B picture motion vector generated in said B picture motion vector generator; and a motion vector field former for forming a motion vector field of each picture corresponding to the motion vectors respectively input from said B picture motion vector generator, said P picture motion vector generator and said I picture motion vector generator.

34. The stereoscopic image generation apparatus of claim 32, wherein said motion type determiner analyzes the motion vectors corresponding to the current picture generated in said motion vector generation and storing unit, and determines the motion type of the current picture as one of a still picture, a non-horizontal motion picture, a horizontal motion picture and a fast motion picture.

35. The stereoscopic image generation apparatus of claim 34, wherein said motion type determiner determines the motion type of the current picture based on a ratio occupied by the macroblocks having a motion feature corresponding to said each motion type among the entire macroblocks of the current picture.

36. The stereoscopic image generation apparatus of claim 35, wherein said motion type determiner comprises at least one of a motion/still picture determiner, a horizontal/non-horizontal motion picture determiner and a horizontal/fast motion picture determiner, said motion/still picture determiner determining the motion type of the current picture into one of a still picture and a motion picture, based on a ratio occupied by the still macroblocks among the whole macroblocks of the current picture, said horizontal/non-horizontal motion picture determiner determining the motion type of the current picture into one of a non-horizontal motion picture and a horizontal motion picture, based on a ratio occupied by the non-horizontal macroblocks based on the maximum vertical fusion threshold angle and the maximum vertical parallax threshold value among the whole macroblocks of the current picture, and said horizontal/fast motion picture determiner determining the motion type of the current picture into one of a fast motion picture and a horizontal motion picture, based on a ratio occupied by the fast motion macroblocks based on the maximum horizontal parallax threshold value among the whole macroblocks of the current picture.

37. The stereoscopic image generation apparatus of claim 34, wherein said stereoscopic image generator comprises at least one of a mixed still picture generator, a mixed non-horizontal motion picture generator, a mixed fast motion picture generator, and a mixed horizontal motion picture generator, if the motion type of the current picture is determined as a still picture in said motion type determiner, said mixed still picture generator allocating depth information differently from each other based on a brightness of predetermined each block in the current picture and/or the standard deviation thereof, converting the allocated depth information into a horizontal parallax, and generating the mixed picture, if the motion type of the current picture is determined as a non-horizontal motion picture in said motion type determiner, said mixed non-horizontal motion picture generator allocating a parallax value differently from each other between the macroblocks whose motion directions are same as the camera motion direction and the macroblocks whose motion directions are not same as the camera motion direction, in the case that both the camera and the object move in the current picture and generating the mixed picture, allocating a parallax value differently from each other between the motion macroblocks and the still macroblocks, in the case that only the object moves in the current picture and generating the mixed picture, and obtaining a parallax value corresponding to a current macroblock using at least one motion vector of peripheral edge macroblock according to the edge feature of the current macroblock and the motion vector of the previous picture macroblock, in the case that only the camera moves in the current picture and generating the mixed picture, if the motion type of the current picture is determined as a fast motion picture in said motion type determiner, said mixed fast motion picture generator converting the motion vector of the fast motion macroblocks in the current picture into the maximum horizontal parallax value, so that the macroblocks is moved by the maximum horizontal parallax value, mixing the horizontally moved macroblocks with the just previous picture to thereby generate the mixed picture, and if the motion type of the current picture is determined as a horizontal motion picture in said motion type determiner, said mixed horizontal motion picture generator generating the previous picture based on the maximum horizontal parallax threshold value and the predetermined horizontal motion value of the motion vectors in the current picture, as mixed picture.

38. The stereoscopic image generation apparatus of claim 34, wherein said left/right picture determiner selects the first mode in the case that the motion type of the current picture is determined as the motion types which are not the horizontal motion picture in said motion type determiner, and adaptively selects one of the first mode and the second mode according to the motion kind of the camera and/or the object in the current picture in the case that the motion type of the current picture is determined as the horizontal motion picture in said motion type determiner, in which the first mode is a stereoscopic image display mode where the current picture is determined as a left picture and the corresponding mixed picture is determined as a right picture, and the second mode is a stereoscopic image display mode where the current picture is determined as a right picture and the corresponding mixed picture is determined as a left picture.

39. The stereoscopic image generation apparatus of claim 34, further comprising a motion type redeterminer for adaptively redetermining the motion type of the current picture determined in said motion type determiner, based on the combination of each motion type of the current picture and the previous picture, in order to remarkably reduce the picture trembling between the temporally successive stereoscopic images, in which the redetermined motion type of the current picture is used for generation of the corresponding stereoscopic image and/or determination of the left/right picture.

40. The stereoscopic image generation apparatus of claim 39, wherein said motion type redeterminer does not change the motion type of the current picture if the motion type of the previous picture is a still picture, said motion type redeterminer adaptively readjusts the threshold values used at the time of the initial determination of the motion type of the current picture according to the combination of each motion type of the current picture and the previous picture, and redetermines the motion type of the current picture, if the motion types of the previous picture and the current picture are different from each other, and said motion type redeterminer redetermines the motion kind of the camera and/or the object in the non-horizontal motion picture or the horizontal motion picture and determines the previous picture corresponding to the horizontal motion picture considering the horizontal motion velocities of both the previous and current pictures, if the motion types of the previous picture and the current picture are same.

* * * * *

UNITED STATES PATENT AND TRADEMARK OFFICE
CERTIFICATE OF CORRECTION

PATENT NO.    : 6,377,625 B1
DATED         : April 23, 2002
INVENTOR(S)   : Man Bae Kim et al.

It is certified that error appears in the above-identified patent and that said Letters Patent is hereby corrected as shown below:

<u>Title page,</u>
Item [75], Inventors, add the following inventor's name:
-- Ho Seok Kang, Songnam (KR) --

Signed and Sealed this

Twentieth Day of January, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,377,625 B1
DATED : April 23, 2002
INVENTOR(S) : Man Bae Kim

It is certified that error appears in the above-identified patent and that said Letters Patent is hereby corrected as shown below:

<u>Title page,</u>
Item [75], add the following inventor's name:
-- Ho Seok Kang, Songnam (KR) --

Signed and Sealed this

Twenty-fourth Day of February, 2004

JON W. DUDAS
*Acting Director of the United States Patent and Trademark Office*